(12) United States Patent
Liu et al.

(10) Patent No.: US 10,573,050 B1
(45) Date of Patent: Feb. 25, 2020

(54) MARKER-BASED POSE ESTIMATION

(71) Applicant: SONY CORPORATION, Tokyo (JP)

(72) Inventors: Cheng-Yi Liu, San Jose, CA (US);
Daisuke Tahara, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/196,120

(22) Filed: Nov. 20, 2018

(51) Int. Cl.
*G06T 13/40* (2011.01)
*G06T 17/20* (2006.01)

(52) U.S. Cl.
CPC .............. *G06T 13/40* (2013.01); *G06T 17/20* (2013.01); *G06T 2200/04* (2013.01)

(58) Field of Classification Search
CPC ................................ G06T 13/40; G06T 17/20
See application file for complete search history.

(56) References Cited

U.S. PATENT DOCUMENTS

| 8,452,080 | B2 | 5/2013 | Engedal | |
|---|---|---|---|---|
| 9,317,741 | B2 | 4/2016 | Guigues et al. | |
| 2017/0046865 | A1* | 2/2017 | Cantwell | G06T 13/40 |
| 2019/0066351 | A1* | 2/2019 | Noh | G06T 13/40 |

FOREIGN PATENT DOCUMENTS

WO    WO-2008014513 A2 *  1/2008  ............ G06T 13/40

OTHER PUBLICATIONS

Thomas Helten, "Processing and Tracking Human Motions Using Optical, Inertial, and Depth Sensors", 2013, 110 pages.
Okada, et al., "Relevant Feature Selection for Human Pose Estimation and Localization in Cluttered Images", ECCV 2008, Part II, LNCS 5303, Springer-Verlag Berlin Heidelberg 2008, p. 434-445.

* cited by examiner

*Primary Examiner* — Jitesh Patel
(74) *Attorney, Agent, or Firm* — Chip Law Group

(57) ABSTRACT

A system for marker-based pose estimation includes display of a 3D human body model on a display screen. The system includes circuitry that assigns a weight to each marker of a plurality of markers distributed on a human body. The circuitry determines an objective function for each joint of the plurality of joints based on a set of descendant markers. The circuitry updates each parameter of a first plurality of parameters that defines a first pose of the human body, based on a change in a value of the objective function. The circuitry determines a second plurality of parameters that defines a second pose of the human body based on the updated first plurality of parameters. The circuitry controls movement of the rigged 3D human body model on the display screen in synchronization with the second pose.

20 Claims, 12 Drawing Sheets

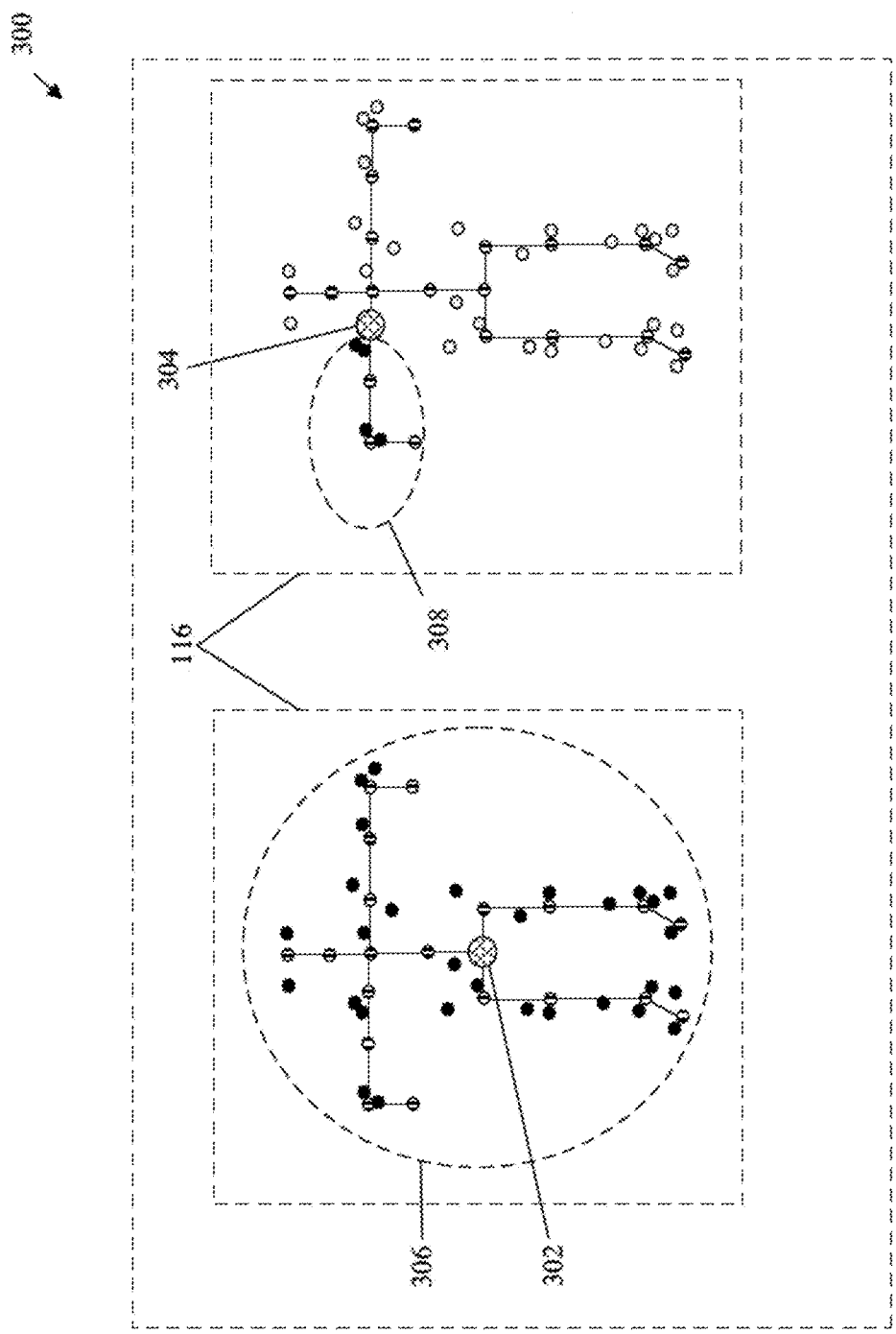

MARKER-BASED POSE ESTIMATION

CROSS-REFERENCE TO RELATED APPLICATIONS/INCORPORATION BY REFERENCE

None.

FIELD

Various embodiments of the disclosure relate to three-dimensional (3D) modeling technologies. More specifically, various embodiments of the disclosure relate to marker-based pose estimation.

BACKGROUND

Human pose estimation is increasingly used in various computer vision applications, such as human-computer interaction, face modeling, human activity recognition, video surveillance, and the like. Traditional graph-based methods or elastic models have been used to estimate human poses. However, human pose estimation have inherent challenges due to the large appearance variance, non-rigidity of the human body, different viewpoints, cluttered background, self-occlusion etc. Video based human pose estimation methods are also very complex, and mostly inaccurate. Motion Capture (MoCap) is a state-of-the-art technique which is pervasively used in 3D content presentation, movies, animations, gaming, sports, virtual reality, and augmented reality industries. Currently, the core technology or computation in a marker-based MoCap is to estimate the human pose from detected 3D marker positions on human body. However, the estimation is difficult because the problem related to computation contains multiple parameters, for example, 50~100 parameters, to be optimized, which is, computationally intensive, time consuming, and error prone.

Further limitations and disadvantages of conventional and traditional approaches will become apparent to one skill in the art, through comparison of described systems with some aspects of the present disclosure, as set forth in the remainder of the present application and with reference to the drawings.

SUMMARY

A system and a method for marker-based pose estimation are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3 illustrates descendent markers associated with a joint in accordance with an embodiment of the disclosure.

DETAILED DESCRIPTION

Figure 1A:
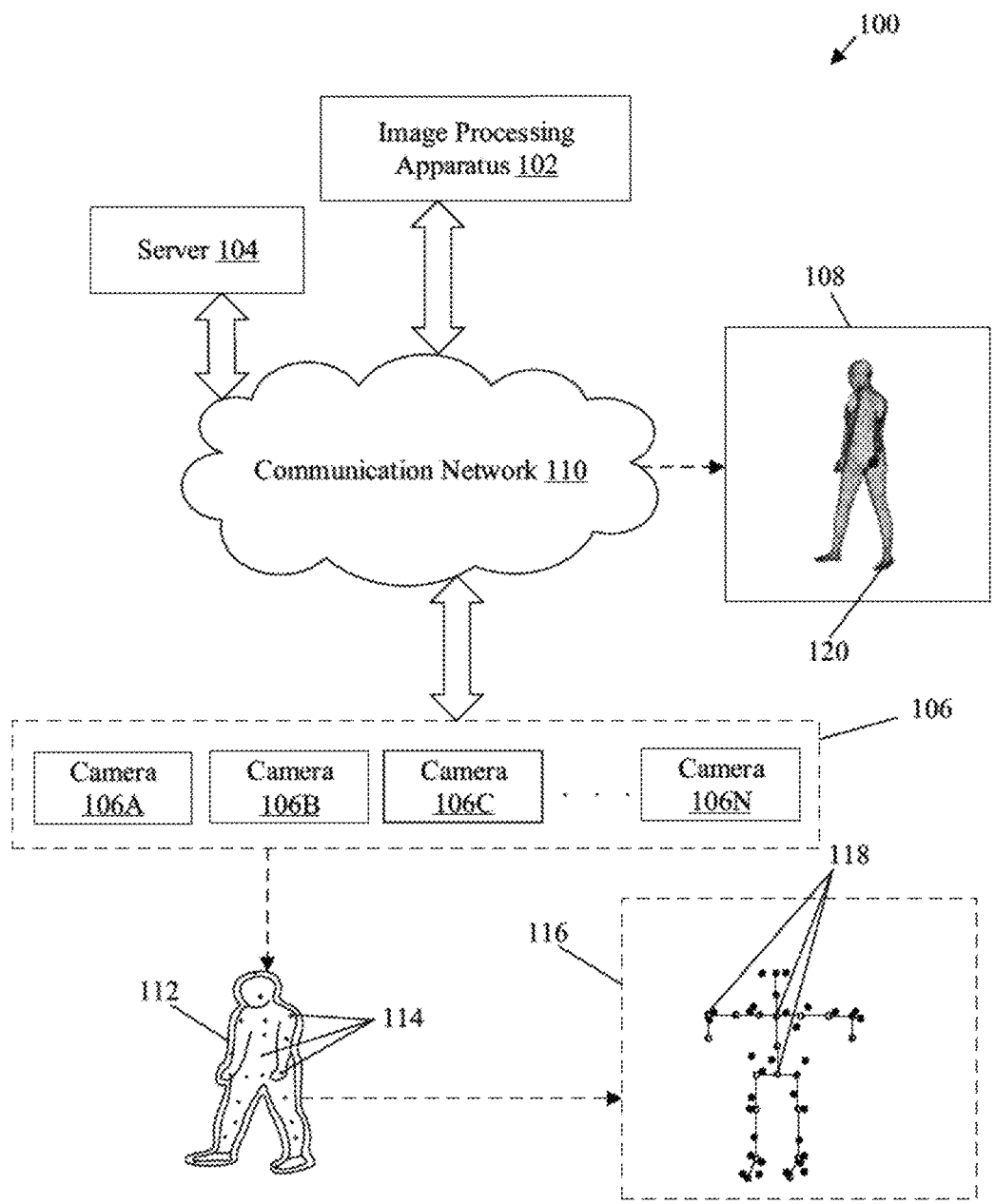
FIGS. 1A and 1B, collectively illustrate an exemplary network environment for marker-based pose estimation, in accordance with an embodiment of the disclosure.

Various embodiments of the present disclosure may be found in a system and a method for marker-based pose estimation. The disclosed system may include a display screen configured to display a rigged 3D human body model that represents a human body. A plurality of markers may be distributed on a body of a human subject, whose pose is to be estimated, such that at least one marker of the plurality of markers may be associated with pose estimation of a joint. The disclosed system may further include circuitry that assigns a weight to each marker in accordance with human skeleton hierarchy. The circuitry determines an objective function value for each joint based on the weights assigned to a set of descendent markers that is a set of markers whose positions may vary as the position of the associated joint varies. The objective function value may be re-determined in each iteration of a count of iterations. The objective function may correspond to a difference between observed marker positions and estimated marker positions from an initial pose of the body. The circuitry updates a plurality of motion parameters, which may define a pose of the body, in each iteration based on a change in the objective function value with respect to a change in value of the plurality of motion parameters. In other words, the plurality of motion parameters (may also be referred to as pose parameters) may be updated based on gradient computation of the objective function with respect to the plurality of motion parameters. The updated plurality of motion parameters may define a final pose of the body (or an optimal solution), which may be required to accurately control movement of the rigged 3D human body model in synchronization with actual body movement. As a result of the weighted gradient computation, overall efficiency is significantly improved without an adverse impact on accuracy of human pose estimation.

In existing marker-based human pose estimation techniques, problems arise in optimization of multiple parameters, for example, 50~100 pose/motion parameters. In theory, the whole body pose estimation may be formulated as a series of matrix multiplications with complicated trigonometric inverse functions, which is very difficult to solve computationally. Currently, in practice, heuristic methods (e.g.: Cyclic Coordinate Descent (CCD) families or Pseudo inverse Jacobian families) are designated to solve the pose parameters. However, accuracy is compromised due to the assumptions that are made in the heuristics. For example, the CCD-based methods are capable to process only one single chain of joints at a time, and the estimation of whole body pose requires a merging operation, which in turn introduces errors to each chain. For pseudo inverse Jacobian-based methods, typically the rules designed for approximating the inverse matrices introduce errors. Besides, pseudo inverse Jacobian-based methods are known to be slow in practical implementations.

The disclosed system for marker-based pose estimation utilize weighted gradient descent (WGD) based technique which fuses human skeleton hierarchy in a gradient descent (GD) computation for highly-accurate pose estimation. The circuitry of the disclosed system assigns a weight to each marker in accordance with human skeleton hierarchy in the WGD technique before pose estimations, which improves the pose estimation accuracy. Further, as the objective function value (which is used in pose estimation) is determined for each joint based on the weights assigned to a set of descendent markers, the total computational time and computational resources used to estimate an accurate human pose is significantly reduced. In some embodiments, selective coordinate descent (SCD) based technique may be also used along with the WGD so as to further increase the speed of WGD while maintaining high accuracy in pose estimation.

Figure 1B:
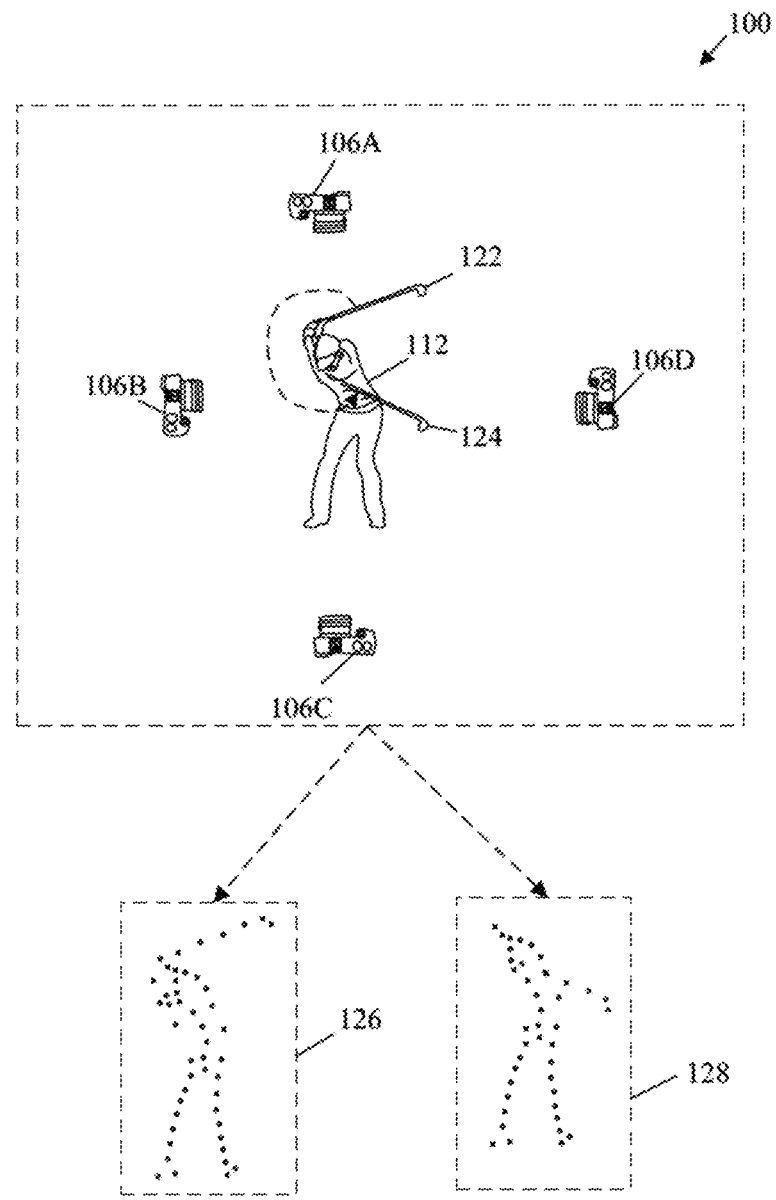

FIGS. 1A and 1B, collectively illustrates an exemplary network environment for marker-based pose estimation, in accordance with an embodiment of the disclosure. With reference to FIG. 1A, there is shown a network environment 100. The network environment 100 may include an image-processing apparatus 102, a server 104, a plurality of cameras 106, a display device 108, and a communication network 110. A human subject 112, whose pose is to be estimated, may be associated with the image-processing apparatus 102. A plurality of markers 114 may be distributed on a body of the human subject 112. The image-processing apparatus 102, the server 104, the plurality of cameras 106), and the display device 108 may be communicatively coupled to each other, via the communication network 110.

The image-processing apparatus 102 may comprise suitable logic, circuitry, interfaces, and/or code that may be configured to process one or more digital images and/or videos. The image-processing apparatus 102 may be configured to store a marker-joint model 116 that may represent the human subject 112. The marker-joint model 116 may be a model that defines association between the plurality of markers 114 (artificial markers) and a plurality of joints 118 (actual joints) of the body of the human subject 112. The marker-joint model 116 may also be referred as a marker-skeleton model 116. The image-processing apparatus 102 may be configured to estimate one or more poses of the human subject 112. The image-processing apparatus 102 may transmit the estimated pose to the display device 108 for display. Examples of the image-processing apparatus 102 may include, but are not limited to, an augmented reality-based device, a virtual reality system, a server, a media processing device, a smart appliance, a gaming console, a digital camera, a smart television, a video-conferencing system, a computing device, or other consumer electronic (CE) device.

The server 104 may comprise suitable logic, circuitry and interfaces that may be configured to store a reference 3D human body model 120 and structural information of a skeleton (e.g., a rig) comprising the plurality of joints 118. The reference 3D human body model may also be referred as the rigged human body model, which may be a computer graphic 3D model having a digital rig and may represent a human body. In some embodiments, the server 104 may be further configured to store the one or more digital images and/or videos. In some embodiments, the server 104 may be implemented as a cloud server, which may be utilized to execute the various operations of the server 104 through, for example, web applications, cloud applications, HTTP requests, repository operations, file transfer, gaming operations, and the like. Other examples of the server may include, but are not limited to a database server, a file server, a web server, an application server, a mainframe server, or other types of server.

The plurality of cameras 106 may comprise suitable logic, circuitry, interfaces, and/or code that may be configured to capture the one or more digital images and/or videos. Further, the plurality of cameras 106 may be configured to transmit the captured one or more digital images and/or videos, such as a color image, as input to the image-processing apparatus 102 for processing. Each camera of the plurality of cameras 106 may include a lens assembly and an image sensor that may enable the camera to capture the one or more digital images and/or videos. The plurality of cameras 106 may be placed around the human subject 112 such that the one or more digital images of the human subject 112 may be captured from different directions. In other words, the plurality of cameras 106 may have different viewing directions. The image sensor of each camera of the plurality of cameras 106 may be implemented by use of a charge-coupled device (CCD) technology or complementary metal-oxide-semiconductor (CMOS) technology. Examples of the plurality of cameras 106 may include, but are not limited to, at least a camera that includes both depth and color image sensor, an image sensor, a camcorder, a stereoscopic camera and/or an action camera.

The display device 108 may comprise suitable logic, circuitry, interfaces, and/or code that may be configured to receive the reference 3D human body model 120 from the server 104. The display device 108 may be configured to render the reference 3D human body model 120. The display device 108 may be further configured to receive the estimated pose of the human subject 112 from the image-processing apparatus 102. The display device 108 may be further configured to control the movement of the reference 3D human body model 120 in accordance with the estimated pose of the human subject 112. Examples of the display device 108 may include, but are not limited to, a laptop, a tablet computer, a smartphone, a display screen, and/or other display devices. In some embodiments, the display device 108 and the image processing apparatus 102 may also be implemented on a same device, without a deviation from the scope of the disclosure.

The communication network 110 may include a medium through which the image-processing apparatus 102 may communicate with the server 104. Examples of the communication network 110 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The plurality of markers 114 may be distributed on the body of the human subject 112 such that at least one marker is associated with a joint of the plurality of joints 118 of the body of the human subject 112. The pose of the human subject 112 may be defined by the positions of the plurality of markers 114. Examples of the plurality of markers 114 may include, but are not limited to, QR codes, acoustic, inertial, LED, magnetic or reflective markers, or a combination thereof. The plurality of markers 114 may be on a motion-capture suit that is worn by the human subject 112. In some embodiments, the plurality of markers 114 may be directly attached to the skin or a custom marker bases clothing (or suit) of the human subject 112.

In operation, the plurality of cameras 106 may be configured to capture a plurality of images of the human subject 112 from different viewpoints. The plurality of cameras 106 may transmit the captured plurality of images to the image processing apparatus 102 for further processing. The image processing apparatus 102 may be configured to determine the positions of the plurality of markers 114 on the body of the human subject 112 based on the plurality of images. The human subject 112 may be at rest or in motion at an instance of capture of the plurality of images. In accordance with an embodiment, the display device 108 may be configured to acquire from the server 104, the reference 3D human body model 120, which may be associated with the human subject 112. The display device 108 may be configured to display the reference 3D human body model 120. The image processing apparatus 102 may be further configured to estimate a pose of the human subject 112 based on the positions of the plurality of markers 114 and the marker-skeleton model 116. The image processing apparatus 102 may be further configured to transmit the estimated pose of the human subject 112 to the display device 108. The display device 108 may be further configured to control the movement of the reference 3D human body model 120 in accordance with the pose of the human subject 112.

In accordance with an embodiment, the image processing apparatus 102 may be configured to assign a weight to each marker of the plurality of markers 114 based on a distance between each marker and an associated joint of the plurality of joints 118. The weight may be a factor to decide a contribution of a marker in determining a pose of a joint of the plurality of joints 118. The pose of each joint may define the pose of the human subject 112. The image processing apparatus 102 may be further configured to determine an objective function for each joint of the plurality of joints 118 based on the weights assigned to a set of descendant markers corresponding to each joint, for a number of iterations. The number of iterations may be less than or equal to a threshold count of iterations specified based on experimentations and/or a user input. The set of descendant markers associated with a joint may be defined as the markers whose positions may vary on movement the joint. The objective function may be defined as a difference of observed marker positions and estimated marker positions. The observed marker positions may be the positions of the markers determined from the plurality of images from an initial pose of the human subject 112 (or marker positions visually detected through the plurality of cameras 106), and the estimated marker positions may be the positions of the markers estimated from a first pose of the human subject 112. The first pose of the human subject 112 may be defined by a plurality of motion parameters, which include translational and rotational motion parameters for each joint. The image processing apparatus 102 may be further configured to update the plurality of motion parameters based on a change in value of the objective function. The image processing apparatus 102 may be further configured to determine a second pose of the human subject 112 based on the updated plurality of motion parameters. The image processing apparatus 102 may be further configured to control the movement of the reference 3D human body model 120 on the display device 108 in synchronization with the second pose of the human subject 112.

The image processing apparatus 102 may be further configured to store the plurality of motion parameters for each joint in the first pose of the human subject 112. The image processing apparatus 102 may be further configured to determine a change in the value of the objective function for a change in value of each motion parameter of the plurality of motion parameters. The change in the value of the motion parameter may be an increase or decrease of the value. The image processing apparatus 102 may be further configured to update each motion parameter based on either the increased or the decreased value, which results in minimum change in the value of the objective function.

The image processing apparatus 102 may be further configured to update the first pose of the human subject 112 based on the updated plurality of motion parameters. The image processing apparatus 102 may be further configured to determine a total objective function for the updated first pose, which corresponds to a sum of the value of objective function for each joint of the plurality of joints 118. The image processing apparatus 102 may be further configured to determine the updated first pose of the human body as the second pose of the human subject 112, in a first case when the value of the total objective function is less than a threshold value, or in a second case when the number of iterations exceeds the threshold count. The threshold value may be specified in advance, based on the experimentations and/or the user input. The image processing apparatus 102 may be further configured to attenuate the weight assigned to each marker of the plurality of markers 114, in each iteration in the number of iterations.

With reference to FIG. 1B, there is shown an operational environment 100B. The operational environment 100B may include the plurality of cameras 106, such as a first camera 106A, a second camera 106B, a third camera 106C, and a fourth camera 106D. The human subject 112 may move from a first pose 122 to a second pose 124.

The plurality of cameras 106 may be configured to capture the plurality of images of the human subject 112 from different viewpoints, such that a 360 degree view of the human subject 112. The plurality of markers 114 may be detectable unique points or LEDs which may emit light of a certain wavelength. The plurality of cameras 106 may comprise visible light color filters on the image sensor, such that only the light emitted by the LEDs may be transmitted. A first point cloud 126 may be generated from the captured plurality of images, where the first point cloud 126 may indicate the positions of the plurality of markers 114 distributed on the body of the human subject 112 in the first pose 122. A second point cloud 128 generated based on the plurality of images, where the second point cloud 128 may indicate the positions of the plurality of markers 114 in the body of the human subject 112 in the second pose 124.

In accordance with an embodiment, the display device 108 may be further configured to display the reference 3D human body model 120 stored in the server 104. The image processing apparatus 102 may be configured to acquire, from the plurality of cameras 106, the first point cloud 126 and the second point cloud 128. It should be noted that, the image processing apparatus 102 may acquire a series of point clouds from the plurality of cameras 106 in a sequence in accordance with the movement of the human subject 112. The image processing apparatus 102 may be further configured to determine a first pose for the reference 3D human body model 120, which may be identical to the first pose 122, based on the first point cloud 126. The image processing apparatus 102 may be further configured to determine a second pose for the reference 3D human body model 120, which may be identical to the second pose 124, based on the second point cloud 128. The determined first pose and the second pose for the reference 3D human body model 120 may define a motion profile of the human subject 112. The image processing apparatus 102 may be further configured to transmit, to the display device, the determined first pose and the second pose for the reference 3D human body model 120 i.e., the motion profile of the human subject 112. The display device 108 may be further configured to control the movement of the reference 3D human body model 120 from the first pose to the second pose in synchronization with the motion profile of the human subject 112 (or the movement of the human subject 112 from the first pose 122 to the second pose 124).

In some embodiments, the control at the display device 108 may occur in real time. In other embodiments, the image processing apparatus 102 may store the motion profile of the human subject 112 in the server 104. The display device 108 may extract the motion profile of the human subject 112 from the server 104 to control the movement of the reference 3D human body model 120 on the display device 108.

In some embodiments, the display device 108 and the image processing apparatus 102 may be same device. In other words, the reference 3D human body model 120 may be displayed on a display screen of the image processing apparatus 102. In such scenario, the control of the movement of the reference 3D human body model 120 may also occur in the real time.

In accordance with an embodiment, the display device 108 may be configured to acquire, from the server 104, a defined motion profile of a person different from the human subject 112. For example, the defined motion profile may be a swing of a golf club by the person skilled in that sport. The display device 108 may be further configured to compare the defined motion profile with the motion profile of the human subject 112. The display device 108 may be further configured to generate a recommendation for the human subject 112 based on a difference between the defined motion profile and the motion profile of the human subject 112.

Figure 2:
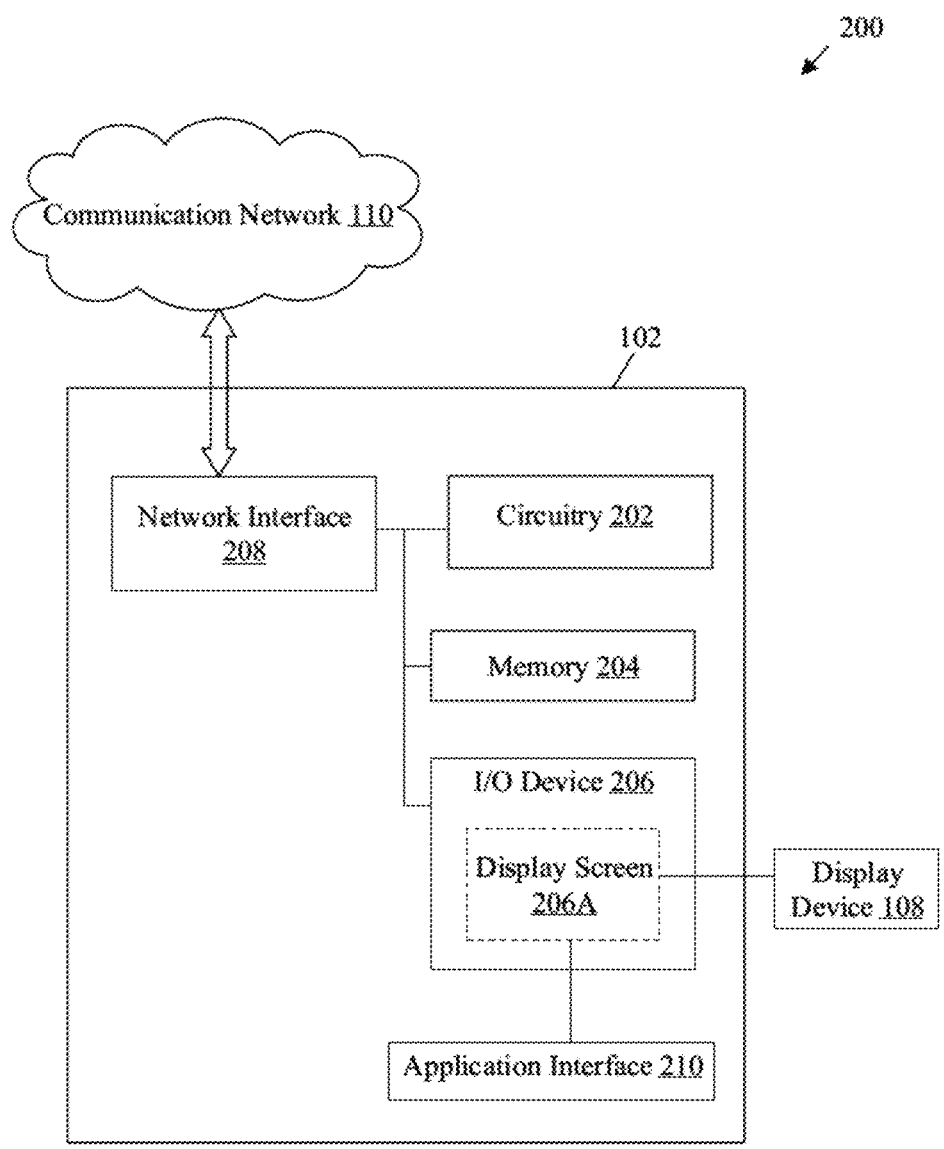
FIG. 2 is a block diagram that illustrates an exemplary image processing apparatus with various peripheral components for marker-based pose estimation, in accordance with an embodiment of the disclosure.

FIG. 2 is a block diagram that illustrates an exemplary image processing apparatus with various peripheral components for marker-based pose estimation, in accordance with an embodiment of the disclosure. FIG. 2 is explained in conjunction with elements from FIG. 1. With reference to FIG. 2, there is shown the image processing apparatus 102. The image processing apparatus 102 may include a circuitry 202, a memory 204, an input/output (I/O) device 206, and a network interface 208. The I/O device 206 may include a display screen 206A, which may be utilized to render an application interface 210. The circuitry 202 may be communicatively coupled to the memory 204 and the I/O device 206. The circuitry 202 may be configured to communicate with the server 104, the plurality of cameras 106, and the display device 108, by use of the network interface 208.

The circuitry 202 may comprise suitable logic, circuitry, and/or interfaces that may be configured to determine an initial pose of the body of the human subject 112 based on the point cloud (observed marker positions, i.e., marker positions visually detected through the plurality of cameras 106) and the marker-skeleton model 116. A pose of the body of the human subject 112 may be represented by a plurality of motion parameters. The circuitry 202 may be further configured to optimize the initial pose of the body of the human subject 112 based on the weighted gradient descent of each motion parameter. The circuitry 202 may comprise one or more specialized processing units, which may be implemented as a separate processor or circuitry in the image processing apparatus 102. In an embodiment, the one or more specialized processing units and the circuitry 202 may be implemented as an integrated processor or a cluster of processors that perform the functions of the one or more specialized processing units and the modeling circuitry 202, collectively. The modeling circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, a Complex Instruction Set Computing (CISC) processor, programmable logic devices (PLDs), an Application-Specific Integrated Circuit (ASIC), SOC, FPGA, a microcontroller, a central processing unit (CPU), or other control circuits.

In accordance with an embodiment, the circuitry 202 may be further configured to initialize the pose of the each individual joint of the body by a rigid body pose estimator, in which a pose of a child joint may be estimated by considering the pose of its parent joint to be fixed. The circuitry 202 may be further configured to execute an iterative numerical method which is based on a gradient descent (GD) global optimization framework. In this framework, each joint may have different objective function integrating the positioning errors of the set of descendent markers associated with each joint, and the markers may be weighted inversely proportional to the distances to the associated joint. The circuitry 202 may be further configured to update the pose of the body each time the number of iterations exceeds a threshold count of iterations so that the plurality of motion parameters may be adjusted to a finer scale, which may allow to locate the global optimal solution precisely. The threshold count of iterations may be set based on user input and/or prior experimentations.

To accelerate the process, the circuitry 202 may be further configured to determine whether joints are in a steady state over iterations so that the joints in the steady state may be locked from being updated in following iterations. The circuitry 202 may be further configured to apply the gradient computation only to non-locked joints in the following iterations. According to this framework, the speed of the WGD may be significantly increased while maintaining the high accuracy in pose estimation.

The memory 204 may comprise suitable logic, circuitry, and/or interfaces that may be configured to store a set of instructions executable by the modeling circuitry 202. The memory 204 may be configured to store operating systems and associated applications. In accordance with an embodiment, the memory 204 may be further configured to store the first point cloud 126 and the second point cloud 128 (observed marker positions). The memory 204 may be configured to store the reference 3D human body model and the marker-skeleton model 116 that may indicate structural information of the skeleton comprising the plurality of joints 118 of the human body and the associated plurality of markers 114. The memory 204 may be further configured to store the plurality of motion parameters. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to receive an input from the human subject 112 and provide an output to the human subject 112 based on received input from the human subject 112. For example, the I/O device 206 may be utilized to initialize the operation to estimate the pose of the human subject 112 based on a request from the human subject 112. The I/O device 206 may comprise various input and output devices, which may be configured to communicate with the circuitry 202. Examples of the I/O device 206 may include, but are not limited to, a touch screen, a keyboard, a mouse, a joystick, a microphone, a display screen (for example, the display screen 206A), and a speaker.

The display screen 206A may comprise suitable logic, circuitry, and/or interfaces that may be configured to render the application interface 210 at the display screen 206A, for display of the reference 3D human body model 120 of the human subject 112. In accordance with an embodiment, the display screen 206A may be configured to receive input from the human subject 112. In such a scenario, the display screen 206A may be a touch screen, which may enable the human subject 112 to provide input. The touch screen may be at least one of a resistive touch screen, a capacitive touch screen, or a thermal touch screen. In accordance with an embodiment, the display screen 206A may receive the input through a virtual keypad, a stylus, a gesture-based input, or a touch-based input. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a smart-glass device, a see-through display, a projection-based display, an electro-chromic display, or a transparent display. In accordance with an embodiment, the display screen 206A may be an external display screen that may be connected to the Image processing apparatus 102.

The network interface 208 may comprise suitable logic, circuitry, and/or interfaces that may be configured to facilitate communication between the image processing apparatus 102, the server 104, and the plurality of cameras 106, via the communication network 108. The network interface 208 may be implemented by use of various known technologies to support wired or wireless communication of image processing apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 210 may correspond to a user interface (UI) rendered on a display screen, such as the display screen 206A, or a display device 216. The application interface 210 may display the reference 3D human body model 120 of the human subject 112. The reference 3D human body model 120 of the human subject 112 may be viewed from a plurality of view-points, by use of the application interface 210. An example of the application interface 210 may include, but is not limited to, a graphical user interface (GUI). The display device 216 may be an external display device. In some embodiments, instead of an integrated display screen 206A, the reference 3D human body model 120 of the human subject 112 may be rendered on the display device 216 that may be remotely located. Examples of the display device 216 may be similar to that of the display screen 206A, FIG. 3 illustrates descendent markers associated with a joint, in accordance with an embodiment of the disclosure. FIG. 3 is explained in conjunction with elements from FIG. 1 and FIG. 2. With reference to FIG. 3, there is shown an environment 300. The environment 300 may include two scenarios, one with the joint under consideration as a hip joint 302, and other with the joint under consideration as a shoulder joint 304.

The set of descendent markers associated with a joint may be defined as a set of markers which may be affected by the movement at the joint. The joint may be a pivot joint and rotation about the pivot joint may result in change in positions of the set of descendent markers. The set of descendent markers may lie on the bones which may move on the rotation about the pivot joint. For the hip joint 302, the set of descendent markers may be markers 306 (represented by thick solid black dots) that include each marker of the plurality of markers 114 (represented by thick solid black dots), as the movement around the hip joint 302 affects all the markers of the plurality of markers 114. The hip joint 302 may also be considered as the root joint in accordance with the human skeleton hierarchy. For the shoulder joint 304, the set of descendent markers may be markers 308 only provided on the upper arm, forearm, and the hand (represented by thick solid black dots within an elliptical orbit) as shown, as the movement around the shoulder joint 304 affects only these parts of the human body.

The number of markers assigned to each joint may be based on biomechanical constraints that may define constraints for each individual joint movement. The biomechanical constraints may be defined in terms of a degree of freedom (DOF) that may correspond to a number of axis around which the joint may rotate freely. For example, at an elbow joint, the DOF may be 2. The number of markers may be assigned in accordance with the human skeleton hierarchy. The root joint may be assigned at least three markers for the whole body pose estimation, as the root joint may serve as a basis for estimation of poses of child bones. It should be noted that once the pose of a parent bone is derived, the child joint of the parent bone may provide one point for the child bone i.e., the child joint may provide an implicit marker, so two more markers on the child bone may be sufficient. However, if the DOF is '1' at the child joint, the number of markers may be further reduced to '1'. The number of markers assigned for each joint in accordance with the DOF is illustrated in Table 1, as follows:

TABLE 1

Number of Markers

| Joint | DOF | Rotations | Number of Markers | Child Bone |
|---|---|---|---|---|
| Head | 3 | Rz * Ry * Rx | 2 | Head |
| Neck | 3 | Ry * Rz * Rx | 2 | Neck |
| Shoulder | 3 | Rz * Rx * Ry | 2 | Shoulder |
| Wrist | 3 | Ry * Rx * Rz | 2 | Wrist |
| Chest | 3 | Ry * Rz * Rx | 2 | Chest |
| Hip | 3 | Ry * Rz * Rx | 3 | Hip |
| UR Hip | 3 | Rz * Rx * Ry | 2 | L/R Hip |
| Ankle | 3 | Rz * Rx * Ry | 2 | Ankle |
| Collar | 2 | Rx * Ry | 2 | Collar |
| Elbow | 1 | Ry | 1 | Elbow |
| Knee | 1 | Ry | 1 | Knee |

Figure 4A:
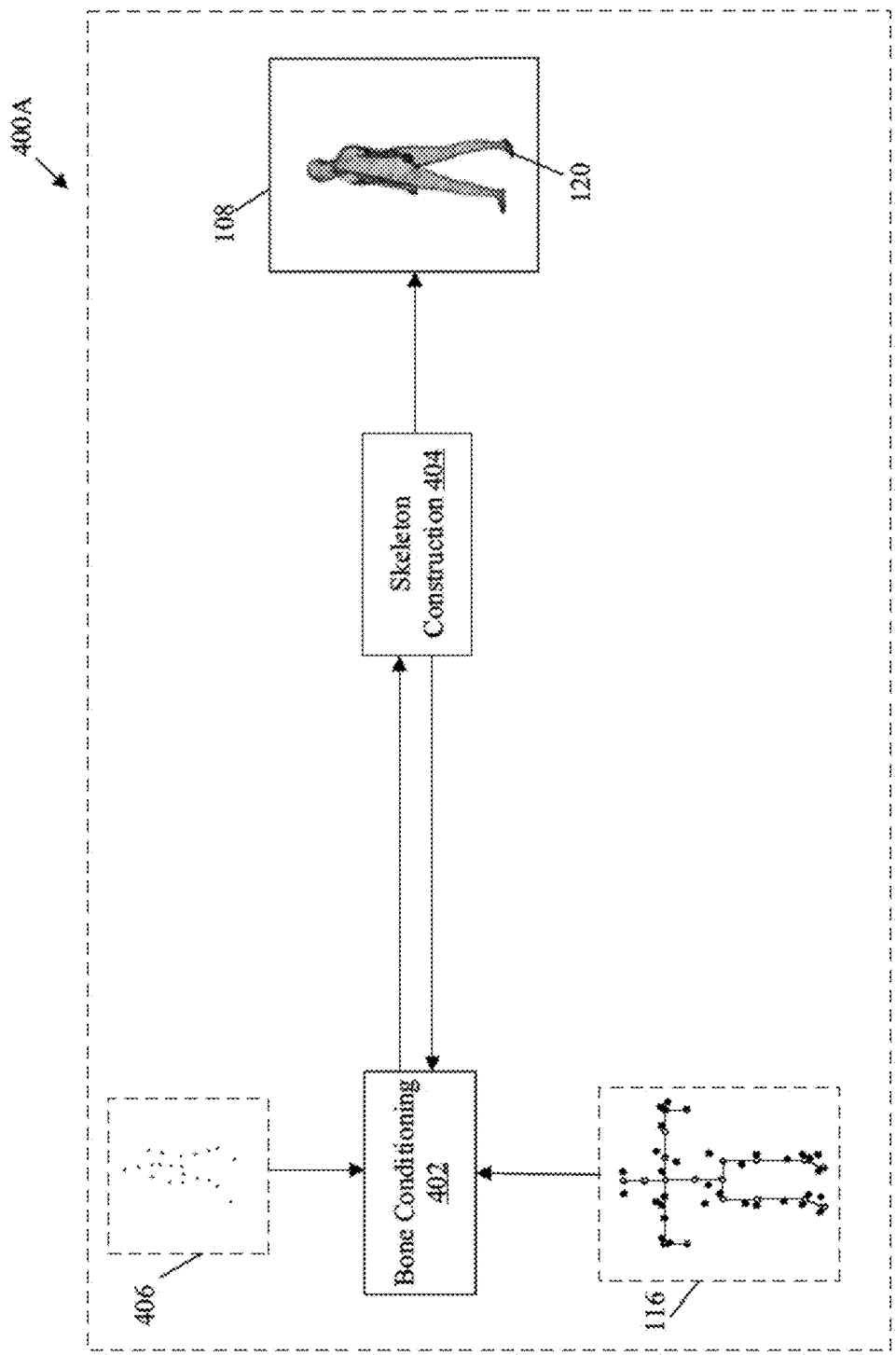
FIG. 4A illustrates pose initialization for marker-based pose estimation, in accordance with an embodiment of the disclosure.

FIG. 4A illustrates pose initialization for marker-based pose estimation, in accordance with an embodiment of the disclosure. FIG. 4A is explained in conjunction with elements from FIGS. 1, 2, and 3. With reference to FIG. 4A, there is shown a block diagram 400A, which includes operations related to bone conditioning 402 and skeleton construction 404.

At the bone conditioning 402, the circuitry 202 may be configured to determine a method (or criteria) for estimating a pose of a joint based on the number of markers corresponding to the joint and the degree of freedom of the joint. The bone conditioning may be an operation, while determining the initial pose of the body, in which a method or a criteria, such as depth of field (DOF)=1, DOF=2, DOF=3 criteria (or method) is determined for estimating the initial pose. The operation(s) of the bone conditioning 402 are further described in detail, for example, in FIG. 4B. The circuitry 202 may be further configured to acquire a point cloud 406 and the marker-skeleton model 116 to determine the pose of a joint. The marker-skeleton model 116 may represent a skeleton hierarchy, in which for each joint, there may be a parent joint and a child joint. The input for pose initialization may be the marker-skeleton model 116 and the point cloud 406 that indicates the observed marker positions (i.e., marker positions that are visible and detectable using the plurality of cameras 106).

At the skeleton construction 404, the circuitry 202 may be configured to build a pose of a joint considering that the parent joint of the joint (i.e., the joint for which the pose is built) is already computed. The circuitry 202 may be further configured to determine the pose of the joint in accordance with the method (or the criteria) determined for pose estimation based on the degree of freedom and the number of markers employed for pose estimation. The initial pose of the body of the human subject 112 may be built by determining the pose of each joint in a sequence starting from the root joint. The initial pose may be further processed to determine a final pose of the body of the human subject 112. The final pose may be an optimized pose, which has minimal difference from the actual pose of the human subject 112. The skeleton construction is further described in detail, for example, in FIG. 4C.

Figure 4B:
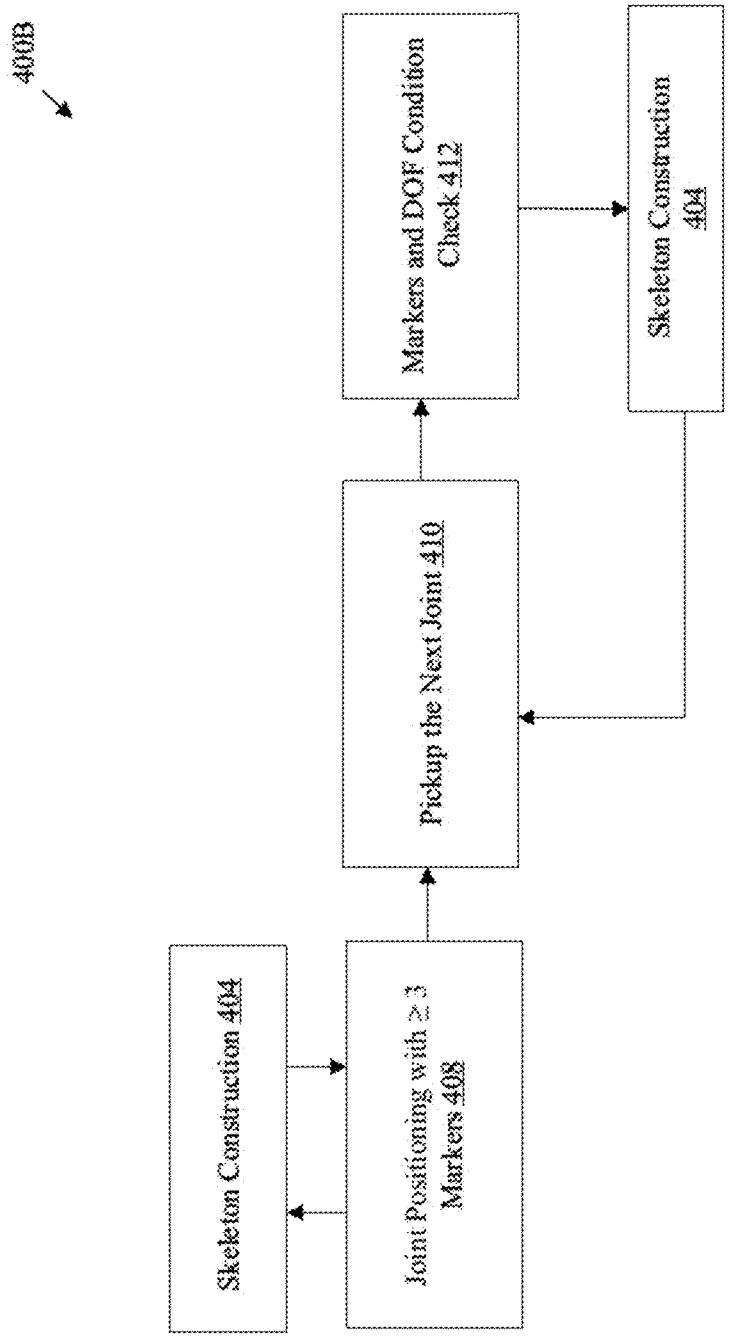
FIG. 4B illustrates bone conditioning for marker-based pose estimation, in accordance with an embodiment of the disclosure.

FIG. 4B illustrates bone conditioning for marker-based pose estimation, in accordance with an embodiment of the disclosure. FIG. 4B is explained in conjunction with elements from FIGS. 1, 2, and 3. With reference to FIG. 4B, there is shown a block diagram 400B, which includes blocks that specify a sequence of operations (a process flow) in the bone conditioning 402. The operations related to the bone conditioning 402 may be required as a joint with DOF less than 3 may not require similar method (or criteria) for pose estimation as a joint with DOF greater than or equal to 3. For bone conditioning 402, initially, the marker-skeleton model 116 and the point cloud 406 may be acquired.

At 408, the circuitry 202 may be configured to determine whether the number of markers associated with estimation of a pose of a joint of a bone (i.e. the joint whose parent joint pose may be already estimated) is greater than or equal to '3' or not. In case the number of markers associated with estimation of the pose of the bone is greater than or equal to '3', the circuitry 202 may be configured to proceed to skeleton construction 404, and the method (or criteria) for the estimation of the pose may be determined as a DOF=3 criteria. The DOF=3 criteria (or method) may be a criteria to estimate the pose of a parent joint of the bone with respect to the counter part of the parent joint in the marker-skeleton model 116, for the bone with at least 3 markers associated with it.

At 410, the circuitry 202 may be further configured to pick the next joint in a sequence in accordance with the marker-skeleton model 116. The next joint may be a joint whose parent joint's pose may be determined at 408. This sequential pickup of the joints may ensure that all joints of the body are traversed as human skeleton is connected. For example, the sequence may be trunk to left upper limb followed by right upper limb, to left lower limb and then right lower limb.

At 412, the circuitry 202 may be configured to execute a DOF and the number of markers check on the joint, which is under consideration. The circuitry 202 may be configured to determine the number of markers on the child bones of the joint, and a number of solved joints based on whether the pose is determined at 406 or not. The number of solved joints may be '2' in case the pose is determined at 408, or otherwise the number of solved joints may be '1'. The circuitry 202 may be further configured to determine whether the sum of the number of markers and the number of solved joints is greater than or equal to '3', or equal to '2'. In case the sum is greater than or equal to '3', the circuitry may be configured to determine the criteria (or method) for pose estimation as the DOF=3 criteria, if the DOF of the joint is '3', or as a DOF=2 criteria, if the DOF of the joint is '2'. Otherwise in case the sum is equal to '2', the circuitry 202 may be configured to determine the method (or the criteria) for pose estimation as a DOF=1 criteria, if the DOF of the joint is '1'. The circuitry 202 may be configured to output the joint ID, the method (or criteria) for pose estimation, the number of markers, and the number of solved joints, to next block of the skeleton construction 404.

At the skeleton construction 404, the pose of the joint may be estimated in accordance with the determined criteria (or method). The estimated pose of the joint may be fed back to the pickup the next joint 410, where the estimated pose of the joint may act as a child joint location for pose estimation of subsequent joints in accordance with the marker-skeleton model 116. After all the joints may be processed for pose estimation, the initial pose of the body of the human subject 112 ($Pose_{init}$) may be outputted for further processing for pose optimization.

Figure 4C:
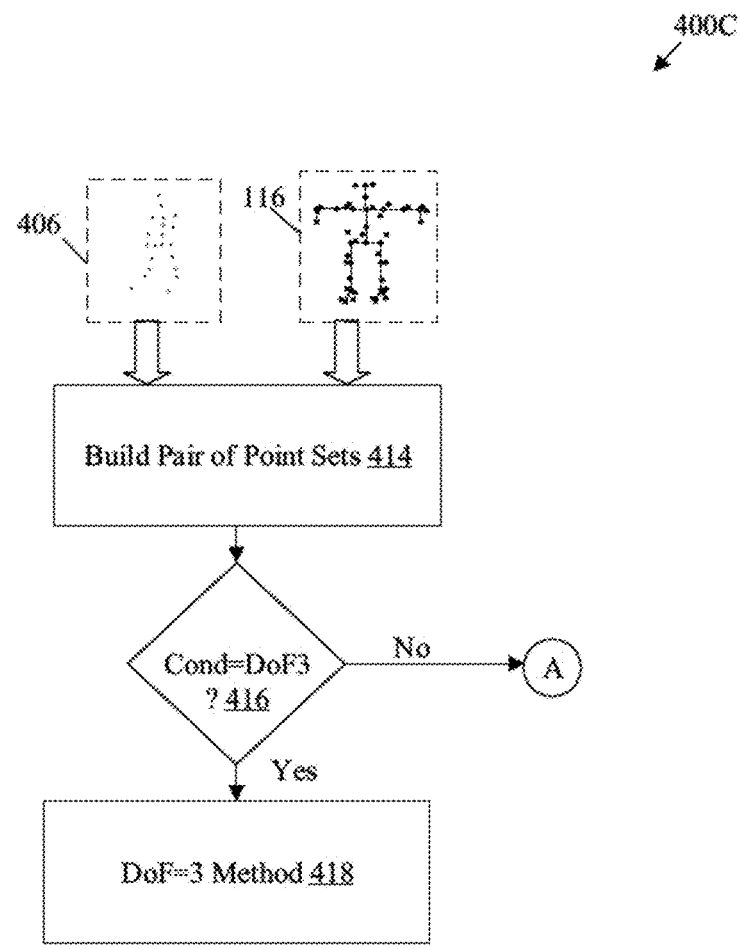
FIGS. 4C and 4D, collectively illustrates skeleton construction process for marker-based pose estimation, in accordance with an embodiment of the disclosure.
Figure 4D:
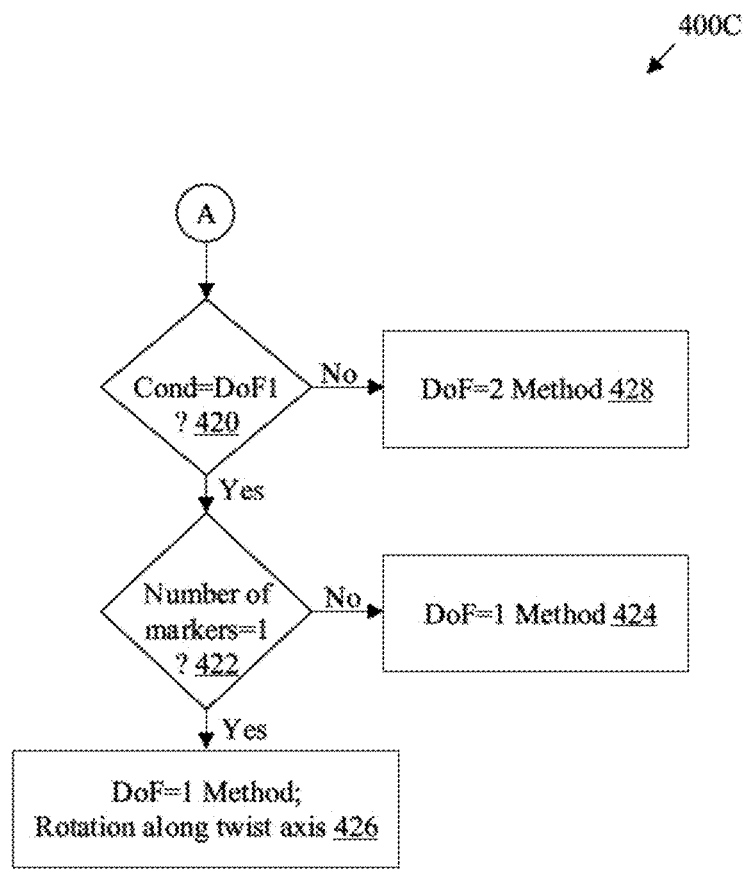

FIGS. 4C and 4D, collectively illustrates a skeleton construction process for marker-based pose estimation, in accordance with an embodiment of the disclosure. FIGS. 4C and 4D are explained in conjunction with elements from FIGS. 1, 2, 3, 4A, and 4B. With reference to FIGS. 4C and 4D, there is shown a block diagram 400C, which specifies process flow for skeleton construction.

At 414, the circuitry 202 may be configured to generate two sets of 3D vectors (e.g., set 1 and set 2) in a sequence in which the plurality of markers 114 may be processed for pose estimation. The set 1 may include vectors between observed marker positions (i.e., marker positions visually detected through the plurality of cameras 106) and the joint. The set 2 may include corresponding vector between the marker and the joint in the marker-skeleton model 116. The circuitry 202 may be further configured to generate two sets of 3D vectors (set 3 and set 4) in a sequence in which the plurality of joints 116 may be processed for pose estimation. The set 3 may include vectors between positions of solved joints (i.e., the joints of the plurality of joints 116, whose pose may be already estimated) and the joint. The set 4 may include corresponding vector between joint positions in the marker-skeleton model 116 and the position of the joint. The circuitry 202 may be further configured to generate set 5 as union of the set 1 and set 3, and set 6 as union of the set 2 and set 4. The set 5 and set 6 may represent a pair of point sets corresponding to observed positions and actual positions of the joints.

At 416, the circuitry 202 may be further configured to determine whether the method (or the criteria) for pose estimation is the DOF=3 criteria. In case the method for pose estimation is the DOF=3 method, the circuitry 202 may be configured to execute the DOF=3 criteria at 418. Otherwise, the control may proceed to 420.

At 418, the circuitry 202 may be further configured to execute the DOF=3 criteria (or method). The circuitry 202 may be configured to determine centroids of both the set 5 and the set 6. The circuitry 202 may be further configured to determine a rotation matrix between points of the set 5 and the set 6, based on the centroids. The points may be the markers or the joints at the bone ends. The rotation matrix specifies the rotational motion around the joint with which the points (e.g., the points of set 5 and the set 6) are associated. The circuitry 202 may be further configured to determine the translational matrix based on the rotation matrix and the centroids. The translational matrix may specify the translational motion of the plurality of joints 116.

At 420, the circuitry 202 may be further configured to determine whether the method (or the criteria) for pose estimation is the DOF=1 criteria. In case the method for pose estimation is the DOF=1 method, the control passes to 422. Otherwise, the control may proceed to 428.

At 422, the circuitry 202 may be further configured to determine whether the number of markers is 1 (a single marker) or not. In case the number of markers is not 1, the control passes to 424. Otherwise, the control may proceed to 426.

At 424, the circuitry 202 may be configured to execute the DOF=1 criteria. The circuitry 202 may be configured to transform the set 5 into a local frame such that the coordinate system of the set 5 and the set 6 is same. The circuitry 202 may be further configured to estimate rotation matrix in 2D, and construct the rotation matrix in 3D based on 2D to 3D transformations of the rotation matrix in 2D.

At 426, the circuitry 202 may be further configured to execute 1D rotation along the rotation axis (i.e., the axis about which the joint may have the DOF or about which the joint may freely rotate). For example, the knee or the elbow joint have only 1 marker and the DOF=1 along the Y-axis ($R_Y$ as shown in Table 1). The circuitry may be further configured to determine the rotational matrix based on the angle between the vector between the observed marker positions (marker positions visually detected through the plurality of cameras 106) and the joint, and the vector between the marker and the joint in the marker-skeleton model 116.

At 428, the circuitry 202 may be configured to execute the DOF=2 criteria. The circuitry 202 may be configured to transform the set 5 into a local frame such that the coordinate system of the set 5 and the set 6 is same. The circuitry 202 may be further configured to rotate one axis at a time in accordance with the rotation order, and execute the DOF=1 criteria one by one to generate a first rotation matrix and a second rotation matrix. The circuitry 202 may be further configured to determine the rotation matrix in 3D based on the multiplication of the first rotation matrix and the second rotation matrix.

The initial pose of the body of the human subject 112 may be defined by the rotation matrix in 3D and the translational matrix. The rotation matrix may indicate rotational motion parameters of each joint in Euclidean X-Y-Z rotation system. The translational matrix may represent translational motion parameters of each joint in X, Y, and Z coordinates. The circuitry 202 may be configured to optimize the initial pose, which is illustrated in details, for example, in FIG. 5.

In accordance with an embodiment, prior to the pose optimization, the circuitry 202 may be configured to transfer the Euclidean X-Y-Z rotation system into a Polar-Azimuth-Twist (PAT) system to reflect the effects of a rotation in biomechanics. For example, the rotation of a join in the Euclidean X-Y-Z rotation system may be represented as $R_X$, $R_Y$, and $R_Z$. The circuitry 202 may transfer $R_X$, $R_Y$, and $R_Z$ into the PAT system as $\varphi$, $\vartheta$, and $\omega$, which may represent the polar angle, the azimuthal angle, and the twist angle respectively of the rotation axis. The translational motion parameters, which may define a pose, may be similar for all the joints in the body of the human subject 112 i.e., equal to the global translation of the root joint with respect to the marker-skeleton model 116. Thus, there may be '3' translational motion parameters [X, Y, Z]. The rotational motion parameters, which may define the pose, may be different for each joint i.e., '3' parameters for each joint. Thus, there may be '$3*N_j$' rotational motion parameters [$\varphi 1$, $\vartheta 1$, $\omega 1$, ..., $\varphi_N$, $\vartheta_N$, $\omega_N$], where $N_j$ represents the total number of joints.

Figure 5A:
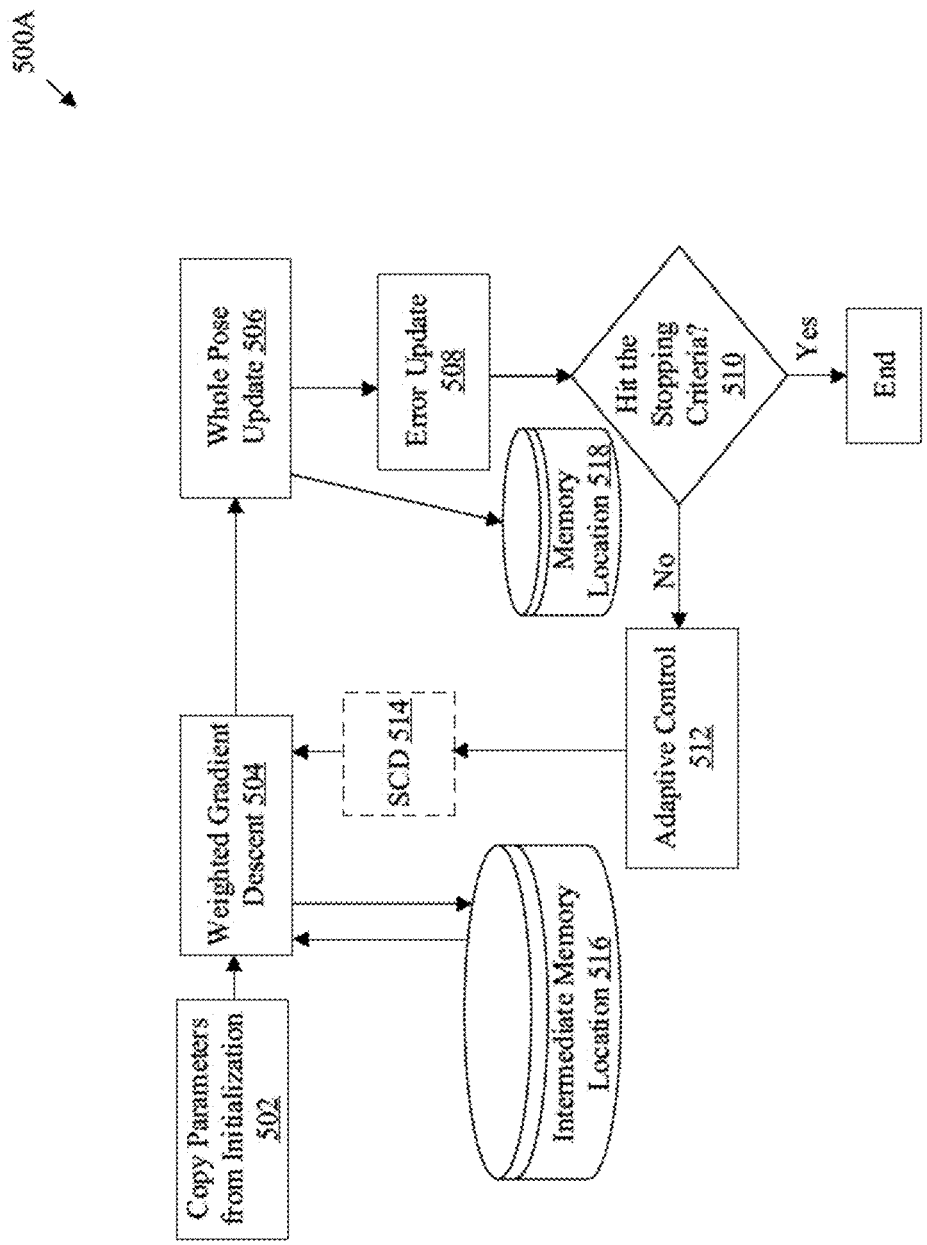
FIGS. 5A and 5B, collectively illustrates pose optimization for marker-based pose estimation, in accordance with an embodiment of the disclosure.
Figure 5B:
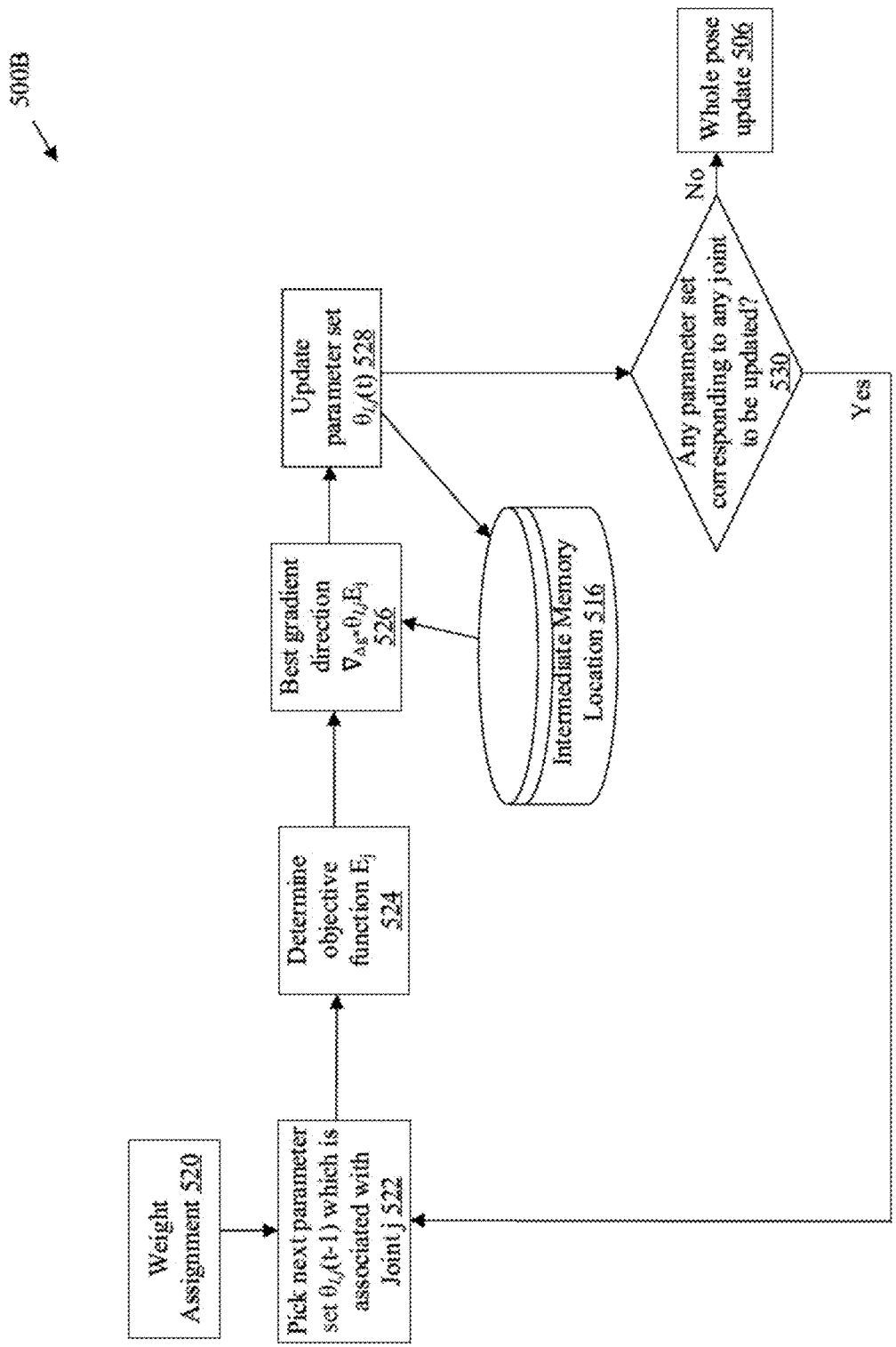

FIGS. 5A and 5B, collectively illustrates pose optimization for marker-based pose estimation, in accordance with an embodiment of the disclosure. FIGS. 5A and 5B are explained in conjunction with elements from FIGS. 1, 2, 3, and 4A to 4D. With reference to FIG. 5A, there is shown a block diagram 500A, which specifies process flow for pose optimization. The circuitry 202 may be configured to acquire the initial pose parameters, a threshold count of iterations, an error threshold value, an updating threshold value, a stepping factor, and a weight factor. The initial pose parameters may be the initial plurality of motion parameters corresponding to the initial pose of the body of the human subject 112. The threshold count of iterations may be a count of iterations in WGD determined based on prior experimentations. The error threshold value may correspond to a maximum total objective function error allowed in the final pose of the body of the human subject 112. In other words, the iterations in WGD may continue until the total objective function error is less than the error threshold value. The iterations in WGD may stop if the difference between the total objective function error and the current pose of the body of the human subject 112 is less than the updating threshold value. The stepping factor may be an initial stepping value to update the plurality of motion parameters. The weight factor may be an initial weight factor required to assign the weights.

At 502, the circuitry 202 may be configured to copy the pose initialization parameters [X, Y, Z] and [φ1, ϑ1, ω1, . . . , φ$_N$, ϑ$_N$, ω$_N$] in the memory at two different locations, such as a first memory location and a second memory location. The first memory location may also be referred as an intermediate memory location 516, and the second memory location may simply be referred as a memory location 518. The first memory location may be a location in the memory 204 which may be accessed multiple times in each iteration. The second memory location may be a location in the memory 204 which may be accessed once after each iteration. In other words, the second memory location may store an updated pose of the body of the human subject 112 after each iteration. The circuitry 202 may be further configured to generate a plurality of parameter sets from the pose initialization parameters. The parameter set may be a set of parameters (or motion parameters of the plurality of motion parameters), for which a gradient is computed jointly. The plurality of parameter sets may include 3 parameter sets (X parameter set, Y parameter set, and Z parameter set) for the global translation motion parameters, and 2 parameter sets ((φ, ε) parameter set and ω parameter set) for the global rotational motion parameters. The polar angle φ and the azimuthal angle ϑ are in same set as a unit variation in the polar angle φ results in change in the azimuthal angle ϑ.

At 504, the circuitry 202 may be further configured to execute the weighted gradient descent (WGD) on each parameter set of the plurality of parameter sets in each iteration in the count of iterations. The plurality of parameters sets may be a plurality of sets of motion parameters (translational and rotational parameters). In each iteration, the plurality of parameter sets may be updated for each joint. In order to execute the weighted gradient descent in an iteration, the circuitry 202 may be further configured to extract each parameter set from the first memory location. The circuitry 202 may be further configured to update each parameter set, and store each updated parameter set in the first memory location. The weighted gradient descent in described in detail in FIG. 5B.

At 506, the circuitry 202 may be further configured to update the whole pose of the body of the human subject 112 after each iteration. The circuitry 202 may be further configured to extract the updated plurality of parameter sets from the first memory location and update the pose based on the updated plurality of parameter sets. The circuitry 202 may be further configured to store the updated pose in the memory second location.

At 508, the circuitry 202 may be further configured for error update to determine a total marker error for the updated pose after each iteration. The circuitry 202 may be further configured to estimate marker positions by locating markers in the marker-skeleton model 116 and the updated pose. The circuitry 202 may be further configured to determine the total marker error as the sum of differences between the observed marker positions (marker positions visually detected through the plurality of cameras 106) and the estimated marker positions. The total marker error may also be considered as summation of the objective function values of each parameter. The total marker error may be represented as shown in equation 1, $$E_{Total}(t) = \Sigma_{\forall\ observed\ markers} \|m_{i,est}(t) - m_{i,obs}\| \quad (1)$$

where $m_{i,est}(t)$ may represent the estimated marker position after iteration 't', and $mi_{,obs}$ may represent the observed marker position. The $\|.\|$ is a norm operator, which may be the Euclidean norm.

At 510, the circuitry 202 may be further configured to determine whether one of the following stopping criteria is satisfied or not after each iteration. The first stopping criteria may provide an indication of whether the difference between total marker error of the pose in a previous iteration and total marker error of the pose in current iteration is less than the updating threshold value. The second stopping criteria may provide an indication of whether the number of iterations exceeds the threshold count of iterations. The third stopping criteria may provide an indication of whether the total marker error of the pose in current iteration is less than the error threshold value. In case one of the stopping criteria is satisfied, the circuitry 202 may be configured to output the pose of the body of the human subject 112 in current iteration as the final pose of the body of the human subject 112. Otherwise, the control may proceed to 512.

At 512, the circuitry 202 may be configured to adaptively control the stepping factor and the weight factor in time for accurately approaching the optimum result. The circuitry 202 may be further configured to depress the weights of markers which are farther from the joint such that each joint parameter may fit with the closest associated markers. The circuitry 202 may be further configured to attenuate the value of the stepping factor such that a finer solution search may be applied when approaching the optimum result. The circuitry 202 may be further configured to attenuate the values of the weight factor and the stepping factor based on current iteration and an attenuation period.

The depression of weights of markers may be represented by equation 2, as follows:

$$\alpha_t = \alpha_0 + 0.1 * \lfloor t/T_{1/2} \rfloor \quad (2)$$

where $\alpha_t$ may represent the weight factor for iteration 't', $\alpha_0$ may represent an initial weight factor (specified at t=0), and $T_{1/2}$ may represent the attenuation period. The attenuation of the values of the stepping factor may be represented by equation 3, as follows:

$$s_t = 0.5^{\lfloor t/T_{1/2} \rfloor} s_0 \quad (3)$$

where, $s_t$ may represent the stepping factor for iteration 't', and $s_0$ may represent an initial stepping factor (specified at t=0). As an example, the attenuation period $T_{1/2}$ may be specified as 2000, the initial weight factor $\alpha_0$ may be specified as 1.5, and the initial stepping factors may be specified as initial $s_X$, $s_Y$, $s_Z$=10, initial $s_{\varphi,\theta}$=1,500, and initial $s_\omega$=4,000. It should be noted that the initial stepping factors may be different or similar for different parameters sets.

In some embodiments, the control may proceed to 504 after the adaptive control at 512, where the WGD may be executed in next iteration with attenuated values of the weight factor and the stepping factor. In other embodiments, the control may proceed to 514 after the adaptive control at 512.

At 514, the circuitry 202 may be further configured to execute a selective coordinate descent (SCD) to reduce the number of parameter sets on which the WGD may be executed, which may accelerate the WGD without degradation in the quality. The circuitry 202 may be further configured to lock a joint from the execution of the WGD in case the joint is stable, and execute the WGD on only the unlocked joints. The stability of the joint may be determined based on a maximum and a minimum objective function value within a specified time window (d).

The circuitry 202 may be further configured to receive a convergence limit $\varepsilon_1$, a divergence limit $\varepsilon_2$, and the time window (d), which may be specified in advance based on a user input and/or experimentations. For example, the time window (d) may be specified as 150 (in terms of iterations), the convergence limit $\varepsilon_1$ as $10^{-5}$, and the divergence limit $\varepsilon_2$ as 0.2. For a joint j, the circuitry 202 may be further configured to determine a first iteration ($t_{max}$) and a second iteration ($t_{min}$) within the time window, which may correspond to the maximum and the minimum objective function values. The circuitry 202 may be further configured to lock the joint j from the iteration in WGD, if a parent joint of the joint j has already been locked, and satisfy one of the following conditions:

(1) Converge/steady: The difference between the maximum and the minimum objective function values is less than the convergence limit $\varepsilon_1$.
(2) Dynamic equilibrium/Diverge: The objective function value for the iteration (t−d) is less than the objective function value for the iteration (t).
(3) Diverge: The difference between the objective function value for the iteration (t) and the minimum objective function is greater than the divergence limit $\varepsilon_2$.

The circuitry 202 may be further configured to select the joints that are unlocked after 'n' iterations, and 'n' may be equal to the attenuation period $T_{1/2}$. The circuitry 202 may be further configured to execute the WGD in following iterations only on the selected joints. This reduces the time required in execution of an iteration in WGD as the number of parameter sets to be updated is reduced.

With reference to FIG. 5B, there is shown a block diagram 500B, which specifies process flow in the execution of WGD in accordance with an embodiment of the disclosure. In each iteration of the execution of the WGD, the process flow as specified below may be followed.

At 520, the circuitry 202 may be configured to assign weight to each marker of the set of descendent markers corresponding to each joint, based on a distance between the marker and the associated joint. For example, as shown in FIG. 3, for the hip joint 302, the set of descendent markers 306 include all of the plurality of markers 114. The markers which may be farther from the joint, may have less affect in determination of the pose of the joint. Thus, these markers may be assigned less weight as compared to the markers which are closer to the joint. The weight assignment may be done in accordance with the equation (4), as follows:

$$w_{j,p} = e^{-\alpha d} \quad (4)$$

where $w_{j,p}$ may represent the weight of marker (p) with respect to joint (j), a may represent the weight factor, and 'd' may represent a number of bones between the joint (j) and the parent joint of marker (p). The weight factor may be determined from the adaptive control at 512.

At 522, the circuitry 202 may be further configured to pick a parameter set ($\theta_{i,j}(t-1)$, where t−1 may represent the parameter set from a previous iteration) associated with the joint j. For simplicity, the $\theta_{i,j}(t-1)$ may also be referred as the parameter set $\theta_i$. The parameter set may be extracted from the first memory location. The parameter set may be a set of motion parameters of the plurality of motion parameters.

At 524, the circuitry 202 may be configured to determine an objective function ($E_j$) for each joint based on the set of descendent markers associated with the joint. The objective function may be an error function which may represent positioning errors between the observed marker positions (marker positions visually detected through the plurality of cameras 106) and the estimated marker positions. The objective function for the joint j may be represented by the equation (5) as follows:

$$E_j(t) = \sum_{p=1}^{Obs_j} \frac{w_{j,p}}{W_j} \cdot \|m_{j,p}^{est}(t) - m_{j,p}^{obs}\| \quad (5)$$

where $Obs_j$ may represent the total number of observed markers on joint j's descendant bones, $m_{j,p}^{obs}$ may represent the pth observed marker position, $m_{j,p}^{est}(t)$ may represent the estimated marker position by joint j's parameters at time t corresponding to $m_{j,p}^{obs}$, $w_{j,p}$ may represent the weight of marker p w.r.t. joint j, and $$W_j = \sum_{p=1}^{P_j} w_{j,p}$$

may represent a normalization factor. The total objective function of all joints may be represented by the equation (6) as follows:

$$E_{Total}(t) = \frac{1}{J} \sum_{j=1}^{J} E_j(t) \quad (6)$$

where J may represent the total number of joints in the marker skeleton model 116.

At 526, the circuitry 202 may be further configured to compute gradient of the objective function ($\Delta E_j$) with respect to change in value of the parameter set ($\Delta\theta$). In a scenario, in which the parameter set includes only one parameter, the $\Delta\theta$ may be set to a constant value. For example, the ω parameter set. In other scenario, in which the parameter set includes two parameters (such as, ($\varphi$, $\vartheta$) parameter set), the $\Delta\varphi$ and $\Delta\vartheta$ may be determined jointly by moving a vector specified by the parameter set with a predefined length. The new position of the vector may provide the $\Delta\varphi$ and $\Delta\vartheta$.

The circuitry 202 may be further configured to determine samples for a gradient direction for computation of the gradient of the objective function. The change in the value of the parameter set (either increase or decrease) may result into the samples of the gradient direction. The possible samples for gradient direction may be equal to $2^n$ (where n represents the number of parameters in the parameter set). For example, the samples for gradient direction for the ($\varphi_j$, $\vartheta_j$) parameter set of joint j may be $2^{2+}$ i.e., 4 samples such as:

$$\Delta_1\theta_j = (\varphi_j - \Delta\varphi_j, \vartheta_j - \Delta\vartheta_j),$$

$$\Delta_2\theta_j = (\varphi_j - \Delta\varphi_j, \vartheta_j - \Delta\vartheta_j),$$

$$\Delta_3\theta_j = (\varphi_j - \Delta\varphi_j, \vartheta_j - \Delta\vartheta_j), \text{ and}$$

$$\Delta_4\theta_j = (\varphi_j - \Delta\varphi_j, \vartheta_j - \Delta\vartheta_j).$$

The circuitry 202 may be further configured to determine the gradient of the objective function ($\nabla_{\Delta_g\theta_j} E_j$) with respect to each sample of gradient direction ($\Delta_g\theta_j$). The circuitry 202 may be further configured to select a best sample of gradient direction ($\Delta_{g^*}\theta_j$) for which the gradient of the objective function ($\nabla_{\Delta_g\theta_j} E_j$) achieves minimum negative value. In case none of the samples of gradient direction result in negative value, the $\Delta_{g^*}\theta_j$ may be considered as 0.

At 528, the circuitry 202 may be configured to update the parameter set in accordance with the best sample of gradient direction. The parameter set may be updated based on the gradient of the objective function in the best sample of gradient direction, and the stepping factors controlled adaptively at 512. The updated parameter set may be represented with equation (7) as follows:

$$\theta_j(t) = \theta_j(t-1) - s_{j,\theta_j} \cdot \nabla_{A_g \cdot \theta_j} E_1 \quad (7)$$

where $\theta_j(t)$ may represent one of the elements in the updated parameter set, $s_{j,\theta_j}$ may represent the stepping factor, and $\nabla_{A_g \cdot \theta_j} E_j$ may represent the gradient of the objective function in the best sample of gradient direction. The circuitry 202 may be further configured to store the updated parameter set in the first memory location.

At 530, the circuitry 202 may be further configured to determine whether any parameter set corresponding to any joint is to be updated. In case any parameter set corresponding to any joint is to be updated, the control may proceed to 524. Otherwise the control may proceed to 506 to update the pose stored in the second memory location.

In conventional marker-based human pose estimation techniques, a series of matrix multiplications with complicated trigonometric inverse functions may be required for optimization of multiple parameters, for example, 50~100 pose/motion parameters, which is very difficult to be solved computationally. Further, a uniform objective function may be utilized for each joint, which further increases the computation time as the number of iterations significantly increases. This is so because in each iteration for computation of the objective function for a joint all markers may be considered, which increases the time required for convergence to the global optimal solution. According to disclosed human pose estimation technique, each joint has different objective function based on the set of descendent markers associated with the joint. In each iteration, only the set of descendent markers may be considered for objective function computation. This significantly reduces the time required for the convergence to the global optimal solution without an adverse impact on accuracy.

Figure 6A:
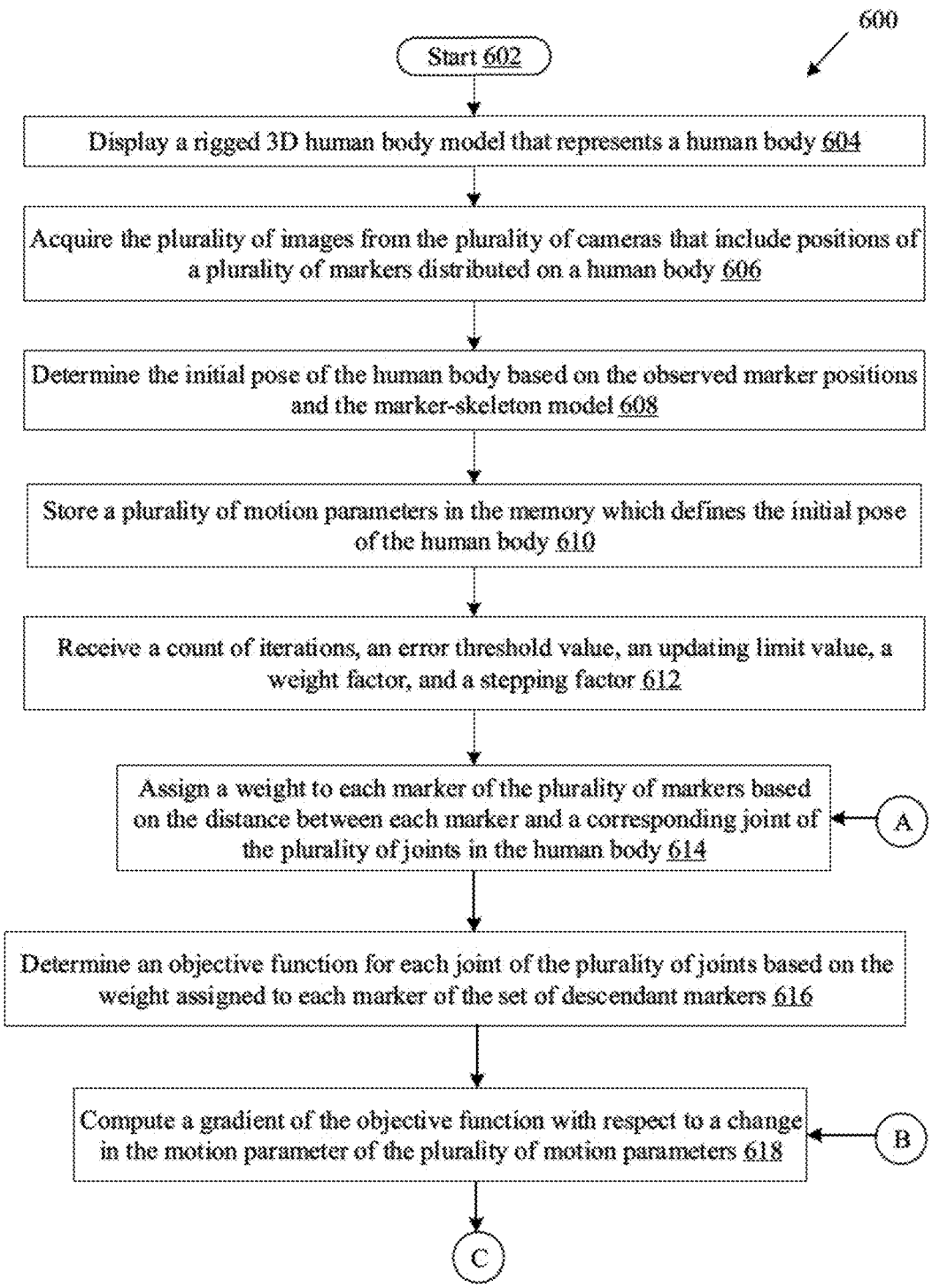
FIGS. 6A and 6B, collectively, is a flowchart that illustrates an exemplary method for marker-based pose estimation, in accordance with an embodiment of the disclosure.
Figure 6B:
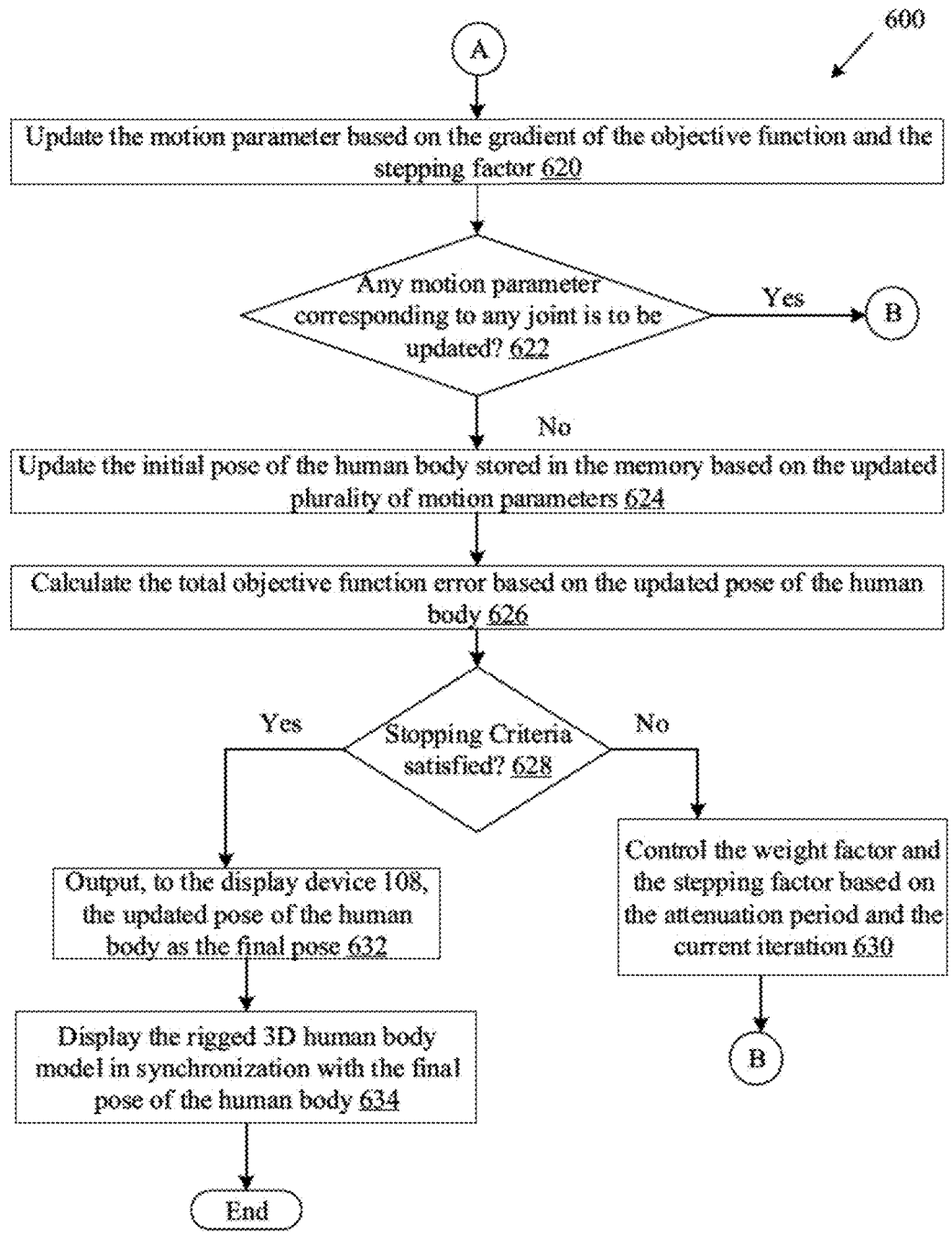

FIGS. 6A and 6B, collectively, is a flowchart that illustrates an exemplary method for marker-based pose estimation, in accordance with an embodiment of the disclosure. FIGS. 6A and 6B are explained in conjunction with elements from FIGS. 1, 2, 3, 4, and 5. With reference to FIGS. 6A and 6B, there is shown a flowchart 600 implemented in the circuitry 202 and the display device 108. The method starts at 602 and proceeds to 604.

At 604, a rigged 3D human body model that represent a human body may be displayed on the display device 108. The rigged human body model may be a computer graphic 3D model having a digital rig and may represent a human body. The display device 108 may be configured to display the rigged 3D human body model.

At 606, a plurality of images may be acquired from a plurality of cameras that include positions of a plurality of markers 114 distributed on a human body, which may correspond to observed marker positions (marker positions visually detected through the plurality of cameras 106). The circuitry 202 may be configured to acquire the plurality of images from the plurality of cameras.

At 608, an initial pose of the human body may be determined based on the observed marker positions (marker positions visually detected through the plurality of cameras 106) and a marker-skeleton model. The circuitry 202 may be configured to determine the initial pose of the human body based on the observed marker positions and the marker-skeleton model.

At 610, a plurality of motion parameters which defines the initial pose of the human body may be stored in memory (e.g. 204). The circuitry 202 may be configured to store the plurality of motion parameters in the memory.

At 612, a count of iterations, an error threshold value, an updating limit value, a weight factor, and a stepping factor may be received. The circuitry 202 may be configured to receive the count of iterations, the error threshold value, the updating limit value, the weight factor, and the stepping factor.

At 614, a weight may be assigned to each marker of the plurality of markers 114 based on a distance between each marker and a corresponding joint of the plurality of joints 118 in the human body. The circuitry 202 may be configured to assign the weight to each marker of the plurality of markers 114 based on the distance between each marker and the corresponding joint of the plurality of joints 118 in the human body.

At 616, an objective function may be determined for each joint of the plurality of joints 118 based on the weight assigned to each marker of a set of descendant markers. The circuitry 202 may be configured to determine the objective function for each joint of the plurality of joints 118 based on the weight assigned to each marker of the set of descendant markers.

At 618, a gradient of the objective function may be computed with respect to a change in a motion parameter of the plurality of motion parameters. The circuitry 202 may be configured to compute the gradient of the objective function with respect to a change in the motion parameter of the plurality of motion parameters.

At 620, the motion parameter (i.e., the motion parameter with respect to which the gradient of the objective function is computed at 618) may be updated based on the gradient of the objective function and the stepping factor. The circuitry 202 may be configured to update the motion parameter based on the gradient of the objective function and the stepping factor.

At 622, it may be determined whether any motion parameter corresponding to any joint is to be updated. The circuitry 202 may be configured to determine whether the any motion parameter corresponding to any joint is to be updated. In cases where any motion parameter corresponding to any joint is to be updated, then the control passes to 618, or else the control passes to 624.

At 624, the pose of the human body stored in the memory may be updated based on the updated plurality of motion parameters. The circuitry 202 may be configured to update the initial pose of the human body stored in the memory based on the updated plurality of motion parameters.

At 626, a total objective function error may be calculated based on the updated pose of the human body. The total objective function error may be summation of the objective function error of individual joints. The circuitry 202 may be configured to calculate the total objective function error based on the updated pose of the human body.

At 628, it may be determined whether one of the stopping criteria is satisfied or not. The stopping criteria may include a first stopping criterion, in which the difference between the total objective function error in a previous iteration and the total objective function error of the pose in current iteration is less than the updating limit value. The stopping criteria may also include a second stopping criterion, in which the number of iterations exceeds the threshold count of iterations, and a third stopping criterion in which the total objective function error in current iteration is less than the error threshold value. The circuitry 202 may be configured to determine whether one of the stopping criteria is satisfied or not. In cases where the one of the stopping criteria is not satisfied, then the control passes to 630, or else the control passes to 632.

At 630, the weight factor and the stepping factor may be controlled based on an attenuation period and the current iteration. The circuitry 202 may be configured to control the weight factor and the stepping factor based on the attenuation period and the current iteration.

At 632, the updated pose of the human body may be outputted to the display device 108 as a final pose. The circuitry 202 may be configured to output, to the display device 108, the updated pose of the human body as the final pose.

At 634, the rigged 3D human body model may be displayed in synchronization with the final pose of the human body. The display device 108 may be configured to display the rigged 3D human body model in synchronization with the final pose of the human body. The control may pass to end.

Certain embodiments of the disclosure may be found in a system. Various embodiments of the disclosure may provide a system that may include a display screen (e.g., the display device 108 (FIG. 1A)) and a circuitry (e.g., the circuitry 202 (FIG. 2)). The display screen may be configured to display a rigged three dimensional (3D) human body model (e.g., the reference 3D human body model 120 (FIG. 1A)) that may represent a human body. The circuitry may be configured to assign a weight to each marker of a plurality of markers (e.g., the plurality of markers 114 (FIG. 1A)) distributed on the human body. At least one marker of the plurality of markers may be associated with each joint of a plurality of joints (e.g., the plurality of joints 118 (FIG. 1A)) in the human body. The assignment of weight to each marker may be based on a distance between each marker and a corresponding joint of the plurality of joints. The circuitry may be further configured to determine an objective function for each joint of the plurality of joints based on the weight assigned to each marker of a set of descendant markers (e.g., the set of descendant markers 306 or 308 (FIG. 3)) of the plurality of markers for a defined first number of iterations. The objective function may be re-determined for each joint of the plurality of joints in each iteration of the defined first number of iterations. The objective function may correspond to a difference between a first position and a second position of each marker of the set of descendant markers at movement of at least one joint of the plurality of joints that defines a first pose of the human body. The circuitry may be further configured to update each motion parameter of a first plurality of motion parameters for the first pose of the human body. The update may be based on a change in an output value of the objective function in each iteration of a second number of iterations that may be less than or equal to the defined first number of iterations. The circuitry may be further configured to determine a second plurality of motion parameters, which may define a second pose of the human body, for each joint of the plurality of joints based on the updated first plurality of motion parameters. The circuitry may be further configured to control movement of the rigged 3D human body model on the display screen such that the rigged 3D human body model may move in synchronization with the second pose based on the determined second plurality of motion parameters In accordance with an embodiment, the circuitry may be further configured to determine the first position of each marker of the plurality of markers based on at least one image of the human body. The first position of each marker of the plurality of markers may correspond to an initial pose of the human body.

In accordance with an embodiment, the circuitry may be further configured to determine the first plurality of motion parameters for each joint of the plurality of joints, based on a marker-joint model (e.g., the marker-skeleton model 116 (FIG. 1A)) that may define a positional relationship between each joint of the plurality of joints and the at least one marker associated with each joint of the plurality of joints.

In accordance with an embodiment, the circuitry may be further configured to estimate the second position of each marker of the plurality of markers based on the first plurality of motion parameters for each joint of the plurality of joints.

In accordance with an embodiment, the set of descendant markers corresponding to a first joint of the plurality of joints may comprise markers of the plurality of markers. A rotation at the first joint may affect positions of the markers. The circuitry may be further configured to assign the weight to a first marker of the plurality of markers for the first joint based on a first factor that may correspond to the affection of the set of descendant markers by the first joint. The weight may be assigned to the first marker based on a count of bones in the human body between the first joint and a parent joint of the first marker. The parent joint may be defined based on a hierarchy of the plurality of joints In accordance with an embodiment, the first plurality of motion parameters may comprise a set of translation parameters and a set of rotation parameters that may define the first pose of the human body.

In accordance with an embodiment, the system may further include memory (e.g., the memory 204 (FIG. 2)) that may be configured to store the first plurality of motion parameters for each joint of the plurality of joints. The circuitry may be further configured to extract, from the memory, a first parameter of the first plurality of motion parameters for a first joint of the plurality of joints, which may have a first value. The circuitry may be further configured to determine the change in the output value of the objective function for a second value of the first parameter and a third value of the first parameter in each iteration of the second number of iterations. The second value may be higher than the first value and the third value may be lower than the first value. The circuitry may be further configured to update each motion parameter of the first plurality of motion parameters based on one of the second value or the third value, for which the change in the output value of the objective function is negative. The circuitry may be further configured to update the first value of the first parameter based on a stepping factor and the change in the output value of the objective function. The circuitry may be further configured to store the updated first value of the first parameter in the memory.

In accordance with an embodiment, the circuitry may be further configured to update the first pose of the human body based on the updated first plurality of motion parameters. The circuitry may be further configured to determine a total objective function for the updated first pose, which may correspond to a sum of the objective function of each joint of the plurality of joints. The circuitry may be further configured to determine the second pose of the human body based on one of a first condition, a second condition, or a third condition. The first condition in which the total objective function may be less than a first threshold value and the second number of iterations may be less than the defined first number of iterations. The second condition in which the defined first number of iterations may exceed a threshold count. The third condition in which an error between the total objective function for the first pose and the total objective function for the updated first pose may be less than a second threshold value. The circuitry may be further configured to attenuate the weight assigned to each marker of the plurality of markers, in each iteration in the defined first number of iterations.

In accordance with an embodiment, the circuitry may be further configured to determine that a difference of a maximum value of the objective function and a minimum value of the objective function for a first joint of the plurality of joints is less than a convergence threshold. The circuitry may be further configured to lock the first joint from the iteration in the defined first number of iterations, based on the determination that the difference of the maximum value and the minimum value is lesser than the convergence threshold. The circuitry may be further configured to determine that a difference of the minimum value of the objective function and a first value of the objective function for the first joint is greater than a divergence threshold. The circuitry may be further configured to lock the first joint from the iteration in the defined first number of iterations, based on the determination that the difference of the first value and the minimum value is greater than the divergence threshold.

In accordance with an embodiment, a count of markers associated with a first joint of the plurality of joints may be based on a degree of freedom around the first joint.

In accordance with an embodiment, the circuitry may be further configured to compute a gradient of the objective function with respect to each parameter of the first plurality of motion parameters in a gradient direction in which the gradient of the objective function may achieve minimum value. The gradient of the objective function may be the change in the output value of the objective function.

In accordance with an embodiment, the system may further include a first plurality of cameras (e.g., the plurality of cameras 106 (FIG. 1A)) configured to acquire a view of the human body of a first user from a plurality of different directions. The circuitry may be further configured to capture, by the first plurality of cameras, motion of the human body of the first user from the first pose to the second pose of the human body. The circuitry may be further configured to generate a first motion profile of the human body of the first user that indicates a series of movements of the human body of the first user for a first sporting action in a sport event from the first pose to the second pose of the human body. The system may further include a memory (e.g. 204) configured to store a defined motion profile of a second user. The circuitry may be further configured to compare the first motion profile of the human body of the first user with the defined motion profile of the second user for at least the first sporting action. The circuitry may be further configured to control the display screen to display a correction in a series of body movements in at least the first sporting action for the second user, based on the comparison. The system may further include a second plurality of cameras configured to acquire a view of the human body of a second user from the plurality of different directions. The circuitry may be further configured to capture, by the second plurality of cameras, motion of the human body of the second user from the first pose to the second pose of the human body. The circuitry may be further configured to generate a second motion profile of the human body of the second user that may indicate a series of movements of the human body of the second user for a second sporting action in the sport event from the first pose to the second pose of the human body. The circuitry may be further configured to compare the first motion profile of the human body of a second user with the second motion profile of the human body of the second user. The circuitry may be further configured to control the display screen to display correction in the series of movements of the human body of the first user for the first sporting action from the first pose to the second pose of the human body, based on the comparison.

In conventional marker-based human pose estimation techniques, a series of matrix multiplications with complicated trigonometric inverse functions may be required for optimization of multiple parameters, for example, 50~100 pose/motion parameters, which is very difficult to be solved computationally. Further, a uniform objective function may be utilized for each joint, which further increases the computation time as the number of iterations significantly increases. This is so because in each iteration for computation of the objective function for a joint all markers may be considered, which increases the time required for convergence to the global optimal solution. According to disclosed system for human pose estimation, each joint has different objective function based on the set of descendent markers associated with the joint. In each iteration, only the set of descendent markers may be considered for objective function computation. The circuitry of the disclosed system assigns a weight to each marker in accordance with human skeleton hierarchy in the WGD technique before pose estimations, which improves the pose estimation accuracy. Further, as the objective function value (which is used in pose estimation) is determined for each joint based on the weights assigned to the set of descendent markers, the total computational time and computational resources used to estimate an accurate human pose is significantly reduced.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
   a display screen configured to display a rigged three dimensional (3D) human body model that represents a human body; and
   circuitry configured to:
      assign a weight to each marker of a plurality of markers distributed on the human body, wherein at least one marker of the plurality of markers is associated with each joint of a plurality of joints in the human body, and wherein the assignment of weight to each marker is based on a distance between each marker and a corresponding joint of the plurality of joints;
      determine an objective function for each joint of the plurality of joints based on the weight assigned to each marker of a set of descendant markers of the plurality of markers for a defined first number of iterations,
         wherein the objective function is re-determined for each joint of the plurality of joints in each iteration of the defined first number of iterations, and
         wherein the objective function corresponds to a difference between a first position and a second position of each marker of the set of descendant markers at movement of at least one joint of the plurality of joints that defines a first pose of the human body;
      update each motion parameter of a first plurality of motion parameters for the first pose of the human body, based on a change in an output value of the objective function in each iteration of a second number of iterations that is less than or equal to the defined first number of iterations;
      determine a second plurality of motion parameters, which defines a second pose of the human body, for each joint of the plurality of joints based on the updated first plurality of motion parameters; and
      control movement of the rigged 3D human body model on the display screen such that the rigged 3D human body model moves in synchronization with the second pose based on the determined second plurality of motion parameters.

2. The system according to claim 1, wherein the circuitry is further configured to determine the first position of each marker of the plurality of markers based on at least one image of the human body, and wherein the first position of each marker of the plurality of markers corresponds to an initial pose of the human body.

3. The system according to claim 1, wherein the circuitry is further configured to determine the first plurality of motion parameters for each joint of the plurality of joints, based on a marker-joint model that defines a positional relationship between each joint of the plurality of joints and the at least one marker associated with each joint of the plurality of joints.

4. The system according to claim 1, wherein the circuitry is further configured to estimate the second position of each marker of the plurality of markers based on the first plurality of motion parameters for each joint of the plurality of joints.

5. The system according to claim 1, wherein the set of descendant markers corresponding to a first joint of the plurality of joints comprises markers of the plurality of markers, and wherein a rotation at the first joint, affects positions of the markers.

6. The system according to claim 5, wherein the circuitry is further configured to assign the weight to a first marker of the plurality of markers for the first joint based on a first factor that corresponds to the affection of the set of descendant markers by the first joint.

7. The system according to claim 6, wherein the weight is assigned to the first marker based on a count of bones in the human body between the first joint and a parent joint of the first marker, and wherein the parent joint is defined based on a hierarchy of the plurality of joints.

8. The system according to claim 1, wherein the first plurality of motion parameters comprises a set of translation parameters and a set of rotation parameters that define the first pose of the human body.

9. The system according to claim 1, further comprising memory configured to store the first plurality of motion parameters for each joint of the plurality of joints,
   wherein the circuitry is further configured to:
      extract, from the memory, a first parameter of the first plurality of motion parameters for a first joint of the plurality of joints, wherein the first parameter has a first value;
      determine the change in the output value of the objective function for a second value of the first parameter and a third value of the first parameter in each iteration of the second number of iterations, wherein the second value is higher than the first value and the third value is lower than the first value; and
      update each motion parameter of the first plurality of motion parameters based on one of the second value or the third value, for which the change in the output value of the objective function is negative.

10. The system according to claim 9, wherein the circuitry is further configured to:
    update the first value of the first parameter based on a stepping factor and the change in the output value of the objective function; and
    store the updated first value of the first parameter in the memory.

11. The system according to claim 1, wherein the circuitry is further configured to:
    update the first pose of the human body based on the updated first plurality of motion parameters;
    determine a total objective function for the updated first pose, wherein the total objective function corresponds to a sum of the objective function of each joint of the plurality of joints; and
    determine the second pose of the human body based on one of:
       a first condition in which the total objective function is less than a first threshold value, wherein the second number of iterations is less than the defined first number of iterations;
       a second condition in which the defined first number of iterations exceeds a threshold count; or
       a third condition in which an error between the total objective function for the first pose and the total objective function for the updated first pose is less than a second threshold value.

12. The system according to claim 11, wherein the circuitry is further configured to attenuate the weight assigned to each marker of the plurality of markers, in each iteration in the defined first number of iterations.

13. The system according to claim 1, wherein the circuitry is further configured to:
  determine that a difference of a maximum value of the objective function and a minimum value of the objective function for a first joint of the plurality of joints is less than a convergence threshold; and
  lock the first joint from the iteration in the defined first number of iterations, based on the determination that the difference of the maximum value and the minimum value is lesser than the convergence threshold.

14. The system according to claim 13, wherein the circuitry is further configured to:
  determine that a difference of the minimum value of the objective function and a first value of the objective function for the first joint is greater than a divergence threshold; and
  lock the first joint from the iteration in the defined first number of iterations, based on the determination that the difference of the first value and the minimum value is greater than the divergence threshold.

15. The system according to claim 1, wherein a count of markers associated with a first joint of the plurality of joints is based on a degree of freedom around the first joint.

16. The system according to claim 1, wherein the circuitry is further configured to compute a gradient of the objective function with respect to each parameter of the first plurality of motion parameters in a gradient direction in which the gradient of the objective function achieves minimum value, and wherein the gradient of the objective function is the change in the output value of the objective function.

17. The system according to claim 1, further comprising a first plurality of cameras configured to acquire a view of the human body of a first user from a plurality of different directions,
  wherein the circuitry is further configured to:
    capture, by the first plurality of cameras, motion of the human body of the first user from the first pose to the second pose of the human body; and
    generate a first motion profile of the human body of the first user that indicates a series of movements of the human body of the first user for a first sporting action in a sport event from the first pose to the second pose of the human body.

18. The system according to claim 17, further comprising a memory configured to store a defined motion profile of a second user, wherein the circuitry is further configured to:
  compare the first motion profile of the human body of the first user with the defined motion profile of the second user for at least the first sporting action; and
  control the display screen to display a correction in a series of body movements in at least the first sporting action for the second user, based on the comparison.

19. The system according to claim 17, further comprising a second plurality of cameras configured to acquire a view of the human body of a second user from the plurality of different directions, wherein the circuitry is further configured to:
  capture, by the second plurality of cameras, motion of the human body of the second user from the first pose to the second pose of the human body;
  generate a second motion profile of the human body of the second user that indicates a series of movements of the human body of the second user for a second sporting action in the sport event from the first pose to the second pose of the human body;
  compare the first motion profile of the human body of a second user with the second motion profile of the human body of the second user; and
  control the display screen to display correction in the series of movements of the human body of the first user for the first sporting action from the first pose to the second pose of the human body, based on the comparison.

20. A method, comprising:
in a hardware system that comprises a display screen and circuitry:
  displaying, by the display screen, a rigged three dimensional (3D) human body model that represents a human body
  assigning, by the circuitry, a weight to each marker of a plurality of markers distributed on the human body,
    wherein at least one marker of the plurality of markers is associated with each joint of a plurality of joints in the human body, and
    wherein the assignment of weight to each marker is based on a distance between each marker and a corresponding joint of the plurality of joints;
  determining, by the circuitry, an objective function for each joint of the plurality of joints based on the weight assigned to each marker of a set of descendant markers of the plurality of markers for a defined first number of iterations,
    wherein the objective function is re-determined for each joint of the plurality of joints in each iteration of the defined first number of iterations, and
    wherein the objective function corresponds to a difference between a first position and a second position of each marker of the set of descendant markers at movement of at least one joint of the plurality of joints that defines a first pose of the human body;
  updating, by the circuitry, each motion parameter of a first plurality of motion parameters for the first pose of the human body, based on a change in an output value of the objective function in each iteration of a second number of iterations that is less than or equal to the defined first number of iterations;
  determining, by the circuitry, a second plurality of motion parameters, which defines a second pose of the human body, for each joint of the plurality of joints based on the updated first plurality of motion parameters; and
  controlling, by the circuitry, movement of the rigged 3D human body model on the display screen such that the rigged 3D human body model moves in synchronization with the second pose based on the determined second plurality of motion parameters.

* * * * *